US008883896B2

(12) United States Patent
Oshita et al.

(10) Patent No.: US 8,883,896 B2
(45) Date of Patent: Nov. 11, 2014

(54) ADHESIVE COMPOSITION FOR AN OPTICAL FILM

(75) Inventors: Shinya Oshita, Tsukuba (JP); Yoshihiro Morishita, Tsukuba (JP); Saori Tamura, Kamisu (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 600 days.

(21) Appl. No.: 13/130,392

(22) PCT Filed: Nov. 24, 2009

(86) PCT No.: PCT/JP2009/069761
§ 371 (c)(1),
(2), (4) Date: May 20, 2011

(87) PCT Pub. No.: WO2010/064551
PCT Pub. Date: Jun. 10, 2010

(65) Prior Publication Data
US 2011/0230609 A1  Sep. 22, 2011

(30) Foreign Application Priority Data

Dec. 5, 2008 (JP) ................. 2008-310528

(51) Int. Cl.
| C08G 18/62 | (2006.01) |
| C08G 18/80 | (2006.01) |
| C09J 153/00 | (2006.01) |
| C09J 7/02 | (2006.01) |
| G02B 1/04 | (2006.01) |
| C08G 18/28 | (2006.01) |
| C08G 18/79 | (2006.01) |
| C08G 18/42 | (2006.01) |
| G02B 1/10 | (2006.01) |

(52) U.S. Cl.
CPC ........... C09J 153/00 (2013.01); C08G 18/8025 (2013.01); C09J 7/0221 (2013.01); G02B 1/04 (2013.01); C08G 18/289 (2013.01); C09J 7/0217 (2013.01); G02B 1/105 (2013.01); C08G 2170/40 (2013.01); G02F 2202/28 (2013.01); C08G 18/792 (2013.01); C08G 18/4238 (2013.01); C08G 18/794 (2013.01)
USPC ........... 524/197; 524/560; 524/561; 524/562; 428/522

(58) Field of Classification Search
USPC ................. 524/197, 560, 561, 562; 428/522
See application file for complete search history.

(56) References Cited

U.S. PATENT DOCUMENTS

| 5,264,527 A | 11/1993 | Varshney et al. |
| 2004/0034183 A1 | 2/2004 | Kato et al. |
| 2006/0009552 A1 | 1/2006 | Husemann et al. |
| 2009/0305068 A1 | 12/2009 | Morishita et al. |

FOREIGN PATENT DOCUMENTS

| CN | 1888000 A | 1/2007 |
| EP | 1 329 466 A1 | 7/2003 |
| EP | 2 009 030 A1 | 12/2008 |
| JP | 6-51121 | 2/1994 |
| JP | 6-93060 | 4/1994 |
| JP | 7-25859 | 3/1995 |
| JP | 7-82542 | 3/1995 |
| JP | 7-133471 | 5/1995 |
| JP | 10-298248 | 11/1998 |
| JP | 11-302617 | 11/1999 |
| JP | 11-323072 | 11/1999 |
| JP | 11-335432 | 12/1999 |
| JP | 2001-318230 | 11/2001 |
| JP | 2003-329837 | 11/2003 |
| JP | 2004-58289 | 2/2004 |
| JP | 2005-307063 | 11/2005 |
| JP | 2006-11365 | 1/2006 |
| JP | 2006-104434 | 4/2006 |
| WO | WO 2008/065982 A1 | 6/2008 |

OTHER PUBLICATIONS

International Preliminary Report on Patentability and Written Opinion issued Jul. 5, 2011 in Application No. PCT/JP2009/069761.
Georges Moineau, et al., Synthesis of fully acrylic thermoplastic elastomers by atom transfer radical polymerization (ATRP), $2^{nd}$ Macromol. Chem. Phys., vol. 201, 2000, pp. 1108-1114.
Extended European Search Report issued Jul. 17, 2012, in Patent Application No. 09830318.3.

Primary Examiner — Peter D Mulcahy
(74) Attorney, Agent, or Firm — Oblon, Spivak, McClelland, Maier & Neustadt, L.L.P.

(57) ABSTRACT

A non-crosslinking type adhesive composition for an optical film is provided that has excellent adhesion to a substrate, allows peeling to be carried out at a suitable peeling strength without leaving an adhesive residue, has excellent reworking properties, can maintain good adhesion properties for a long time, and has excellent durability. The adhesive composition for an optical film includes an acrylic triblock copolymer, which does not have an NCO functional group, and an isocyanate compound. The acrylic triblock copolymer (I), which is represented by the formula A1-B-A2, is formed by alkyl methacrylate polymer blocks A1 and A2 having a Tg of 100° C. or more and an alkyl acrylate polymer block B having a Tg of −20° C. or less, wherein the content of the block B is 40 to 95 mass %, Mw is 50,000 to 300,000, and the molecular weight distribution is 1.0 to 1.5. Based on the mass of the solids in the adhesive composition, the content of the acrylic triblock copolymer (I) is 60 mass % or more, and the content of the isocyanate compound is 0.0015 mass % or more to less than 0.35 mass % in terms of NCO group content.

20 Claims, No Drawings

ADHESIVE COMPOSITION FOR AN OPTICAL FILM

TECHNICAL FIELD

The present invention relates to an adhesive composition for an optical film that is preferably used to adhere an optical film, such as a polarizing plate or a retardation film, to an adherend such as a liquid crystal panel, or to adhere a protective film to an optical film. The present invention also relates to a pressure sensitive adhesive type optical film and a pressure sensitive adhesive type protective film for an optical film having a pressure sensitive adhesive layer formed from the above adhesive composition for an optical film, and an image display device in which such a pressure sensitive adhesive type optical film and/or a pressure sensitive adhesive type protective film for an optical film is used.

BACKGROUND ART

When a pressure sensitive adhesive is used to adhere an optical film, such as a polarizing plate and a retardation film, to a liquid crystal panel and the like, or to adhere a protective film to an optical film, problems such as wrinkles, air bubbles, entrapment of foreign substances, and misalignment can occur. In such a case, the adhered optical film or protective film may be peeled off and re-adhered or the optical film may be peeled off so that the expensive liquid crystal panel can be recovered and recycled. In view of this, pressure sensitive adhesives for optical films that are used to adhere an optical film to an adherend, such as a liquid crystal panel, or to adhere a protective film to an optical film, need to be capable of being peeled at a suitable peeling strength without leaving an adhesive residue, and to have reworking properties that allow the film to be re-adhered.

Further, pressure sensitive adhesives for optical films also need to have a high durability, in which air bubbles are not produced and nor does the film peel from the adherend even when exposed to heating or wet heat.

In particular, pressure sensitive adhesives for optical films used under conditions which are harsher than normal, such as in an optical film that is used in a large-scale display, an automobile display or monitor, an outside display and the like, not only need a much higher adhesive strength than a conventional one, but must also have better reworking properties and durability.

Examples of pressure sensitive adhesives for optical films that have been proposed include:
(1) A pressure sensitive adhesive for a polarizing plate or a retardation plate that includes a graft copolymer or a block copolymer which contains a high glass transition temperature (Tg) polymer segment having a Tg of 50° C. or more and a molecular weight of 500 to 1,000,000 and a low-Tg polymer segment having a Tg that is at least 70° C. lower than the high-Tg polymer segment, wherein the molecular weight as a whole is from 400,000 to 2,000,000 (refer to Patent Document 1); (2) A pressure sensitive adhesive for an optical film that contains 100 parts by weight of an acrylic polymer with a weight average molecular weight of 1,000,000 or more and 1 to 40 parts by weight of an acrylic oligomer with a glass transition temperature of −5° C. or less and a weight average molecular weight of 800 to 50,000 (refer to Cited Document 2); and (3) A pressure sensitive adhesive for an optical film that includes an acrylic polymer as a main component which preferably has a weight average molecular weight of 1,000,000 or more and an acrylic oligomer formed from a block copolymer which has a polymer block with a glass transition temperature thereof alone of −5° C. or less (refer to Cited Document 3).

However, Patent Document 1 only specifically describes as a working example a pressure sensitive adhesive formed from a graft copolymer having a high-Tg polystyrene segment as a branch and a butyl acrylate polymer segment as a main chain. With the pressure sensitive adhesive described in Patent Document 1, a chemical crosslinking treatment is required in order for the adhesion properties to be exhibited. Further, to carry out the crosslinking, functional groups such as hydroxyl groups and carboxyl groups are introduced in advance into the low-Tg polymer segment (main chain) constituting the graft copolymer, which acts as the base of the pressure sensitive adhesive, and a crosslinking agent (e.g., "Coronate L", a trifunctional isocyanate crosslinking agent) is added to a solution of the pressure sensitive adhesive during the coating of the pressure sensitive adhesive, so that the graft copolymer acting as the base is made to undergo chemically crosslinking. Consequently, the pressure sensitive adhesive described in Patent Document 1 requires the post-treatment step of chemical crosslinking during production of the pressure sensitive adhesive type optical film, so that productivity is reduced and adhesion performance tends to vary due to uneven crosslinking.

Further, in the pressure sensitive adhesives described in Cited Documents 2 and 3, the weight average molecular weight of the acrylic polymer acting as the pressure sensitive adhesive base is 1,000,000 or more, which is very high. Consequently, the solution viscosity is high, so that to obtain a pressure sensitive adhesive solution having excellent coating properties and a low viscosity, a large amount of organic solvent has to be used to lower the solid concentration of the pressure sensitive adhesive solution. The use of large amounts of organic solvent produces problems such as environmental contamination and an increase in the time required for the solvent removal step after coating. Moreover, similar to the pressure sensitive adhesive described in Cited Document 1, the pressure sensitive adhesives described in Cited Documents 2 and 3 also require carboxyl groups and the like functional groups to be introduced into the acrylic polymer acting as a base, which react with a crosslinking agent (e.g., "Coronate L", a trifunctional isocyanate crosslinking agent) to form chemical crosslinks, whereby the adhesion properties are exhibited. Since the chemical crosslinking is carried out by adding a crosslinking agent to an pressure sensitive adhesive solution during coating of the pressure sensitive adhesive, a separate post-treatment step of chemical crosslinking during production of the pressure sensitive adhesive type optical film is required, which reduces productivity. In addition, adhesion performance tends to vary due to uneven crosslinking.

Although hot melt pressure sensitive adhesives which include an acrylic triblock copolymer are known (refer to Patent Documents 4 and 5), these documents do not disclose the use of those hot melt pressure sensitive adhesives in an optical film. Further, these documents also do not disclose that the hot melt pressure sensitive adhesives can be turned into a solution type pressure sensitive adhesive by dissolving in an organic solvent, instead of melting, for use as an optical film.

Under such circumstances, the present inventors developed a non-chemical crosslinking type pressure sensitive adhesive for an optical film which has a specific acrylic triblock copolymer as a main component, which they have filed a patent application for (refer to Patent Document 6). This non-chemical crosslinking type pressure sensitive adhesive for an optical film developed by the present inventors does not suffer from the problem of variation in adhesion performance due to uneven crosslinking, and exhibits a good cohesive force even without performing a chemical crosslinking step. Further, this pressure sensitive adhesive has excellent reworking properties, adhesion properties, heat resistance, and durability, and can be very effectively used as a common pressure sensitive adhesive for an optical film. Moreover, the present inventors subsequently continued with their research into non-chemical crosslinking pressure sensitive adhesives for optical films, and found that when such an pressure sensitive adhesive for an optical film is used under harsher conditions, such as in an optical film that is used in a large-scale display, an automobile display or monitor, an outside display and the like, it would be desirable to further improve the adhesion properties and durability.

When peeling off an optical film for the purpose of recycling or to re-adhere the film, or when producing a liquid crystal display or a touch panel, static electricity can be produced. When static electricity is produced, problems can occur such as dust adhering to an optical part, abnormal display caused by disorientation of the liquid crystals, and electrostatic discharge failure of the peripheral circuit elements. From this perspective, to prevent problems caused by static electricity, attempts have been made in the past to impart an antistatic function to optical parts.

For example, it is known to bond an antistatic film via an pressure sensitive adhesive layer to a polarizing plate having a transparent conductive layer or a laminate formed from a polarizing plate having a transparent conductive layer and a retardation plate (refer to Patent Document 7). In this technique, the transparent conductive layer is formed from a transparent film formed by sputtering a conductive layer such as indium oxide/tin oxide, and an antistatic film is used in which the antistatic layer was formed by coating a surfactant.

In addition, a polarizing part having a quarter wave plate, a dichroic polarizing plate, and an antistatic layer on one or both sides of a Grandjean-oriented cholesteric liquid crystal layer is also known (refer to Patent Document 8). Here, the antistatic layer is formed by coating a UV-curable acrylic resin that contains metal oxide particles on the surface of the dichroic polarizing plate.

However, these conventional techniques require a separate step for forming an antistatic layer on an optical part. This increase in the number of steps causes problems such as a decline in productivity and increased costs.

Still further, an adhesive composition having antistatic properties formed by adding an ionic liquid to a polymer having a glass transition temperature Tg of 0° C. or less, and an pressure sensitive adhesive type optical part having an pressure sensitive adhesive layer formed from this adhesive composition on one or both sides of an optical part, are known (Patent Documents 9 and 10). However, this adhesive composition does not have sufficient adhesion to an optical film. Moreover, the adhered optical film or protective film may be peeled off and re-adhered or the optical film may be peeled off so that the expensive liquid crystal panel can be recovered and recycled. However, the reworking properties in recovering and recycling the expensive liquid crystal panel after the peeling-off of the optical film and durability cannot be said to be sufficient yet.

PRIOR ART DOCUMENTS

Patent Documents

[Patent Document 1] Japanese Patent Application Laid-Open No. Hei 7-82542
[Patent Document 2] Japanese Patent Application Laid-Open No. 2003-329837
[Patent Document 3] Japanese Patent Application Laid-Open No. 2004-58289
[Patent Document 4] Japanese Patent Application Laid-Open No. Hei 11-302617
[Patent Document 5] Japanese Patent Application Laid-Open No. Hei 11-323072
[Patent Document 6] WO 2008/065982
[Patent Document 7] Japanese Patent Application Laid-Open No. Hei 6-51121
[Patent Document 8] Japanese Patent Application Laid-Open No. 2001-318230
[Patent Document 9] Japanese Patent Application Laid-Open No. 2006-104434
[Patent Document 10] Japanese Patent Application Laid-Open No. 2006-11365
[Patent Document 11] Japanese Patent Application Laid-Open No. Hei 6-93060
[Patent Document 12] Japanese Patent Publication No. Hei 7-25859
[Patent Document 13] Japanese Patent Application Laid-Open No. Hei 11-335432

Non-Patent Document

[Non-Patent Document 1] Macromol. Chem. Phys., 2000, vol. 201, pp. 1108-1114

SUMMARY OF THE INVENTION

Problems to be Solved by the Invention

It is an object of the present invention to provide a non-crosslinking type adhesive composition for an optical film that does not require a crosslinking treatment, that has excellent adhesion to an optical film even if a chemical crosslinking treatment is not carried out, yet when the optical film is adhered to an adherend or a protective film is adhered to the optical film, peeling can be carried out at a suitable peeling strength without leaving an adhesive residue. Further, this non-crosslinking type adhesive composition for an optical film has excellent reworking properties, and the adhesive strength does not deteriorate nor do air bubbles form even when exposed to high temperatures or to wet heat. Consequently, good adhesion properties can be maintained for a long time, and durability is excellent.

In particular, it is an object of the present invention to provide a non-crosslinking type adhesive composition for an optical film that has high durability in which the adhesion performance and reworking performance can be suitably maintained for a long time without deteriorating or changing, even when the adhesive composition is used in an optical film that is used under conditions which are harsher than normal, such as in an optical film that is used in a large-scale display, an automobile display or monitor, an outside display and the like.

Further, it is an object of the present invention to provide an adhesive composition for an optical film that, along with the above-described excellent adhesion performance and durability, has a good antistatic performance, so that it can prevent the production of static electricity and the various problems caused by static electricity when an optical film is peeled off for the purpose of recycling or to re-adhere the film, or when a liquid crystal display, a touch panel and the like is produced using such an optical film.

In addition, it is an object of the present invention to provide a pressure sensitive adhesive type optical film and a pressure sensitive adhesive type protective film for an optical film having a pressure sensitive adhesive layer formed from the above-described non-crosslinking type adhesive composition for an optical film, and an image display device in which the above-described pressure sensitive adhesive type optical film and/or the pressure sensitive adhesive type protective film for an optical film is used.

Means for Solving the Problems

The present inventors have studied diligently to resolve the above problems. As a result, the present inventors discovered that an adhesive composition for an optical film, which can, while maintaining the adhesive strength to an adherend such as glass in a stable state, selectively increase the interfacial adhesive strength with an optical film, and which has excellent reworking properties, adhesion properties, heat resistance, and durability, when the adhesive composition is prepared by adding an isocyanate compound to a specific acrylic triblock copolymer that does not have a functional group in the molecule which reacts with the isocyanate compound to form a chemical bond. More specifically, this acrylic triblock copolymer does not have a functional group in the molecule that reacts with an isocyanate compound and has an alkyl acrylate polymer block having a glass transition temperature of $-20°$ C. or less as a central block. Either end of the central block is terminated with an alkyl methacrylate polymer block having a glass transition temperature of $100°$ C. or more. The acrylic triblock copolymer has a weight average molecular weight (Mw) of 50,000 to 300,000 and a molecular weight distribution (Mw/Mn) of 1.0 to 1.5, and the content of the central alkyl acrylate polymer block is 40 to 95 mass %.

The present inventors also discovered that, due to the above-described excellent properties, especially its high durability, this adhesive composition for an optical film is very useful as an pressure sensitive adhesive for an optical film used under harsh conditions, for example, an optical film that is used in a large-scale display, an automobile display or monitor, an outside display and the like.

The present inventors also discovered that an adhesive composition for an optical film that not only has excellent durability but also has much better reworking properties could be obtained by incorporating a specific amount of a specific acrylic diblock copolymer in the adhesive composition containing the above specific acrylic triblock copolymer and an isocyanate compound. More specifically, this specific acrylic diblock copolymer is a diblock copolymer in which one alkyl methacrylate polymer block and one alkyl acrylate polymer block are bonded together, has a weight average molecular weight (Mw) of 50,000 to 300,000, a molecular weight distribution (Mw/Mn) of 1.0 to 1.5, and a content of the alkyl acrylate polymer block of 40 to 95 mass %. Further, this specific acrylic diblock copolymer does not have a functional group that reacts with the isocyanate compound.

Further, the present inventors discovered that if an antistatic agent is additionally included in the adhesive composition including the above specific acrylic triblock copolymer and an isocyanate compound, the production of static electricity is prevented when peeling an optical film that was adhered using the adhesive composition for recycling or to re-adhere the film, or when producing a liquid crystal display, a touch panel and the like using such an optical film. Consequently, various problems caused by static electricity can be prevented. In addition, the present inventors discovered that this antistatic performance could be dramatically improved by incorporating a polyol compound when including an antistatic agent in the inventive adhesive composition for an optical film.

The present inventors also discovered that the adhesion durability of the inventive adhesive composition for an optical film dramatically improves if a silane coupling agent is additionally included in the adhesive composition for an optical film. Based on these various discoveries, the present invention was completed.

Specifically, the present invention is as follows.

(1) An adhesive composition for an optical film, characterized by:

(α) comprising an acrylic triblock copolymer (I), which meets requirements (E1), (E2), (E3), and (E4), and an isocyanate compound, wherein The Acrylic Triblock Copolymer (I)

(E1) is represented by the following general formula (1), $$A1\text{-}B\text{-}A2 \quad (1)$$

(wherein A1 and A2 each independently represent an alkyl methacrylate polymer block that does not have a functional group that reacts with the isocyanate compound and has a glass transition temperature of $100°$ C. or more, and B represents an alkyl acrylate polymer block that does not have a functional group that reacts with the isocyanate compound and has a glass transition temperature of $-20°$ C. or less);

(E2) has a content of the polymer block B of 40 to 95 mass %;

(E3) has a weight average molecular weight (Mw) of 50,000 to 300,000; and (E4) has a molecular weight distribution (Mw/Mn) of 1.0 to 1.5;

(β) having a content of the acrylic triblock copolymer (I) of 60 mass % or more based on the mass of solids in the adhesive composition; and (γ) having a content of the isocyanate compound of 0.0015 mass % or more to less than 0.35 mass % in terms of isocyanate groups in the isocyanate compound based on the mass of solids in the adhesive composition.

Further, the present invention is (2) the adhesive composition for an optical film according to above (1), further comprising 3 to 25 mass % of an acrylic diblock copolymer (II) based on the mass of solids in the adhesive composition, the acrylic diblock copolymer (II) meeting requirements (F1), (F2), (F3), and (F4), wherein The Acrylic Diblock Copolymer (II)

(F1) is represented by the following general formula (2), $$C\text{-}D \quad (2)$$

(wherein C represents an alkyl methacrylate polymer block that does not have a functional group that reacts with the isocyanate compound and D represents an alkyl acrylate polymer block that does not have a functional group that reacts with the isocyanate compound);

(F2) has a content of the polymer block D of 40 to 95 mass %;

(F3) has a weight average molecular weight (Mw) of 30,000 to 300,000; and (F4) has a molecular weight distribution (Mw/Mn) of 1.0 to 1.5.

In addition, the present invention is:

(3) The adhesive composition for an optical film according to the above (1) or (2), comprising 0.1 to 10 mass % of an antistatic agent based on the mass of solids in the adhesive composition;

(4) The adhesive composition for an optical film according to the above (3), comprising 0.05 to 9.5 mass % of a polyol compound based on the mass of solids in the adhesive composition;

(5) The adhesive composition for an optical film according to the above (3) or (4), wherein the antistatic agent is an ion conductive agent formed from an alkali metal salt;

(6) The adhesive composition for an optical film according to the above (3) or (4), wherein the antistatic agent is an ionic liquid; and
(7) The adhesive composition for an optical film according to any of the above (1) to (6), comprising 0.01 to 3 mass % of a silane coupling agent based on the mass of solids in the adhesive composition.

Further, the present invention is:
(8) A pressure sensitive adhesive type optical film or a pressure sensitive adhesive type protective film for an optical film, comprising an pressure sensitive adhesive layer formed from the adhesive composition for an optical film according to any of the above (1) to (7); and
(9) An image display device, using the pressure sensitive adhesive type optical film or the pressure sensitive adhesive type protective film for an optical film according to the above (8).

Advantages of the Invention

The adhesive composition for an optical film of the present invention includes an isocyanate compound and an acrylic triblock copolymer (I), which meets the above requirements (E1) to (E4) and does not react with the isocyanate compound. This adhesive composition for an optical film is a non-chemical crosslinking type adhesive composition for an optical film that has the acrylic triblock copolymer (I) as a main component. Further, this adhesive composition has excellent adhesion properties to an optical film substrate, excellent reworking properties, adhesion properties, heat resistance, durability and the like. Consequently, the adhesive composition can be effectively used in the production of an pressure sensitive adhesive type optical film and an pressure sensitive adhesive type protective film for an optical film.

The adhesive composition for an optical film of the present invention has excellent adhesive composition storage stability, which has been a problem for conventional chemical crosslinking type adhesive compositions for optical films, despite the fact that it contains an isocyanate compound. The pressure sensitive adhesive which is left in the adhesive tank during production of the pressure sensitive adhesive type optical film can be stored as is for a long time, or recovered and reused. Further, there are no problems such as variation in the adhesive performance of the product due to uneven crosslinking caused by conditions during the drying step or storage (e.g., temperature, air flow, line speed and retention time). Consequently, the product exhibits even and high-level adhesion properties.

The adhesive composition for an optical film of the present invention, which has the acrylic triblock copolymer (I) as a main component and also includes an isocyanate compound, does not require a chemical crosslinking treatment, and exhibits a high cohesive force even if a chemical crosslinking treatment is not carried out. Further, since the adhesive composition has excellent reworking properties, adhesion properties, heat resistance, durability and the like, a pressure sensitive adhesive type optical film and a pressure sensitive adhesive type protective film for an optical film can be produced with good processability and productivity while omitting a crosslinking step.

When the adhesive composition for an optical film of the present invention is dissolved in an organic solvent and used as a solution type pressure sensitive adhesive, the adhesive composition exhibits a low solution viscosity even in high concentrations. Consequently, while reducing the used amount of organic solvent, a solution type pressure sensitive adhesive having a higher solid concentration than a conventional one (a solution type pressure sensitive adhesive having a solid concentration of 35 mass % or more) can be produced. Such a solution type pressure sensitive adhesive having a high solid concentration has excellent processability, such as improved handleability during coating and line speed. Further, the reduction in the used amount of organic solvent reduces problems such as deterioration of the work environment and environmental pollution caused by the organic solvent. Moreover, this reduction allows the time and the thermal energy that are required for solvent removal step after coating to be reduced. In addition, using a solution type pressure sensitive adhesive having a high solid concentration enables a reduction in transportation costs and enables productivity to be increased due to a reduction in the number of times that the pressure sensitive adhesive is charged into the adhesive tank.

Further, by using the adhesive composition for an optical film of the present invention that includes, in addition to the acrylic triblock copolymer (I) and the isocyanate compound, a silane coupling agent, an antistatic agent, and/or a polyol compound, an pressure sensitive adhesive type optical film can be obtained that has, in addition to properties such as reworking properties, adhesion properties, heat resistance, and durability, even better durability and antistatic performance.

BEST MODE FOR CARRYING OUT THE INVENTION

The present invention will now be described in more detail below.

The term "adhesive composition for an optical film" in the present invention is a collective term for adhesive compositions used to adhere an optical film to some other adherend, and to adhere to the surface of the optical film a protective film for protecting the surface of the optical film, by forming an pressure sensitive adhesive layer on a part or the whole of one or both surfaces of various kinds of film used in optical applications (including, but not limited to, a polarizing film, a polarizing plate, a retardation film, a retardation plate, a view angle enlarging film, a brightness increasing film, an antireflection film, an anti-glare film, a color filter, a light guide plate, a diffusion film, a prism sheet, an electromagnetic wave shielding film, a near-infrared absorption film, and functional composite optical films having a plurality of optical functions).

The acrylic triblock copolymer (I) used in the adhesive composition for an optical film of the present invention is an acrylic triblock copolymer that meets the following requirements (E1) to (E4), which:
(E1) is represented by the following general formula (1);

A1-B-A2 (1)

(wherein A1 and A2 each independently represent an alkyl methacrylate polymer block that does not have a functional group that reacts with an isocyanate compound and has a glass transition temperature of 100° C. or more, and B represents an alkyl acrylate polymer block that does not have a functional group that reacts with an isocyanate compound and has a glass transition temperature of −20° C. or less);
(E2) has a content of the polymer block B of 40 to 95 mass %;
(E3) has a weight average molecular weight (Mw) of 50,000 to 300,000; and
(E4) has a molecular weight distribution (Mw/Mn) of 1.0 to 1.5.

It is important that the polymer blocks A1, B, and A2 constituting the acrylic triblock copolymer (I) do not have a functional group (hereinafter, sometimes referred to as an "isocyanate-reactive functional group") that reacts with an isocyanate compound (isocyanate group).

Examples of isocyanate-reactive functional groups include, but are not limited to, a carboxyl group, a hydroxyl group, a thiol group, an amino group (primary and secondary amino groups), and an amide group. The polymer blocks A1, B, and A2 do not have an isocyanate-reactive functional group like those described above. If the acrylic triblock copolymer (I) has an isocyanate-reactive functional group, a crosslinking reaction occurs between the acrylic triblock copolymer (I) and the isocyanate compound, which causes properties such as adhesive strength to change over time.

Since the adhesive composition for an optical film of the present invention has an acrylic triblock copolymer (I) that does not have an isocyanate-reactive functional group as a main component, a crosslinking step is not necessary and there is only a small change over time.

The two polymer blocks A1 and A2 in the acrylic triblock copolymer (I) are both polymer blocks which are formed from an alkyl methacrylate polymer having a glass transition temperature of 100° C. or more, and which do not have an isocyanate-reactive functional group.

The polymer blocks A1 and A2 formed from an alkyl methacrylate polymer having a glass transition temperature of 100° C. or more act as restrained phases (physical pseudo-crosslinking sites) in the acrylic triblock copolymer (I) that forms a microphase-separated structure at the temperatures that adhesive compositions are usually used at, thereby realizing a cohesive force to the acrylic triblock copolymer (I). As a result, excellent adhesion properties and durability are exhibited.

From the perspectives of durability, heat resistance, ability to track substrate deformation, and suitable stress-alleviation properties, the polymer blocks A1 and A2 in the acrylic triblock copolymer (I) are preferably alkyl methacrylate polymer blocks having a glass transition temperature of 100 to 200° C., and particularly 100 to 150° C.

In the acrylic triblock copolymer (I), the two polymer blocks A1 and A2 may be formed from identical alkyl methacrylate polymers having the same molecular weight, monomer composition, and steric structure (e.g., syndiotacticity), or formed from different alkyl methacrylate polymers having one or two or more different properties, such as molecular weight, monomer composition, and steric structure, as long as they are polymer blocks formed from an alkyl methacrylate that has a glass transition temperature of 100° C. or more.

Examples of the alkyl methacrylate units constituting the polymer blocks A1 and A2 in the acrylic triblock copolymer (I) include alkyl methacrylate units such as methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, and isobornyl methacrylate. The polymer blocks A1 and A2 may be formed from one kind or two or more kinds of these alkyl methacrylate units.

Of these, it is preferred that the polymer blocks A1 and A2 be formed from poly(methyl methacrylate), because the raw material methyl methacrylate can be easily obtained at a low cost and poly(methyl methacrylate) possesses excellent durability and weatherability.

The polymer block B constituting the acrylic triblock copolymer (I) is an alkyl acrylate polymer block having a glass transition temperature of −20° C. or less.

The polymer block B having a glass transition temperature of −20° C. or less imparts excellent flexibility and wettability to the acrylic triblock copolymer (I) that forms a microphase-separated structure at the usual usage temperatures. Consequently, the adhesive composition for an optical film of the present invention (hereinafter, sometimes simply referred to as "adhesive composition of the present invention" or "adhesive composition") exhibits a suitable adhesive strength and good reworking properties.

From the perspective of excellent durability under low-temperature conditions, it is preferred that the polymer block B be formed from an alkyl acrylate having a glass transition temperature of −30° C. or less, and particularly −40 to −80° C.

Examples of the alkyl acrylate units constituting the polymer block B in the acrylic triblock copolymer (I) include alkyl acrylate units such as methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate, and stearyl acrylate. The polymer block B may be formed from one kind or two or more kinds of these alkyl acrylate units.

Of these, it is preferred that the polymer block B be formed from one kind or two or more kinds of propyl acrylate, n-butyl acrylate, 2-ethylhexyl acrylate, and n-octyl acrylate units, because the glass transition temperature of the polymer block B will be −20° C. or less, the adhesive composition will exhibit good adhesive strength and tack at low temperatures, and an increase in adhesive strength and a zipping phenomenon during high-speed peeling can be suppressed.

It is especially preferred for the polymer block B to be formed from an n-butyl acrylate unit and/or a 2-ethylhexyl acrylate unit, because n-butyl acrylate and 2-ethylhexyl acrylate can be inexpensively obtained as general purpose chemicals. Furthermore, the polymer block B has a distinct phase separation from the polymer blocks A1 and A2, the pseudo crosslinking sites of the polymer blocks A1 and A2 are not broken, and the pressure sensitive adhesive shows a high cohesive force and excellent durability.

The polymer blocks A1, A2, and B constituting the acrylic triblock copolymer (I) may contain small amounts of other monomer units (not more than 10 mass % of the polymer blocks) that do not have an isocyanate-reactive functional group, to the extent that the advantageous effects of the present invention are not impaired. Examples of other monomer units which may be contained include (meth)acrylates such as methoxyethyl (meth)acrylate, ethoxyethyl (meth)acrylate, diethylaminoethyl (meth)acrylate, glycidyl (meth)acrylate, and tetrahydrofurfuryl (meth)acrylate; aromatic vinyl monomers such as styrene, α-methylstyrene, and p-methylstyrene; conjugated diene monomers such as butadiene and isoprene; and olefin monomers such as ethylene and propylene. The polymer blocks A1, A2, and B may optionally contain one kind or two or more kinds of these monomer units.

The content of the polymer block B in the acrylic triblock copolymer (I) is 40 to 95 mass %, preferably 50 to 85 mass %, and more preferably 65 to 80 mass %, based on the mass of the acrylic triblock copolymer (I).

By setting the content of the polymer block B in the acrylic triblock copolymer (I) in the above range, the adhesive strength of the adhesive composition is stabilized. If the content of the polymer block B in the acrylic triblock copolymer (I) is less than 40 mass %, the adhesive strength of the adhesive composition deteriorates. On the other hand, if the content is more than 95 mass %, the relative content of the polymer blocks A1 and A2 that provide pseudo crosslinking sites is reduced, which causes a lower cohesive force, resulting in a deterioration in the durability of the adhesive composition.

The weight average molecular weight (Mw) of the acrylic triblock copolymer (I) is 50,000 to 300,000. From the perspective of durability and reworking properties, the weight average molecular weight is preferably 60,000 to 250,000, and more preferably 70,000 to 200,000.

If the weight average molecular weight (Mw) of the acrylic triblock copolymer (I) is less than 50,000, the cohesive force of the adhesive composition is insufficient. Consequently, peeling tends to occur when an optical film using the adhesive composition is adhered to an adherend or when a protective film is adhered to the optical film, which causes durability to deteriorate. On the other hand, if the weight average molecular weight (Mw) of the acrylic triblock copolymer (I) is more than 300,000, the adhesive strength gradually increases during storage of the product, for example. Consequently, reworking becomes more difficult when the optical film or protective film is peeled off and laminated back on to remove wrinkles, air bubbles, entrapment of foreign substances, or misalignment. Further, if the weight average molecular weight (Mw) of the acrylic triblock copolymer (I) is more than 300,000, the solution viscosity increases, which makes it impossible to coat the adhesive composition in high concentrations, so that the used amount of solvent increases.

The molecular weight distribution (Mw/Mn) of the acrylic triblock copolymer (I) is 1.0 to 1.5. From the perspectives of a higher cohesive force and increased durability of the adhesive composition at high temperatures, the molecular weight distribution (Mw/Mn) is preferably 1.0 to 1.4, more preferably 1.0 to 1.3, and even more preferably 1.0 to 1.2.

If the molecular weight distribution (Mw/Mn) of the acrylic triblock copolymer (I) exceeds 1.5, the influence of low-molecular weight components can no longer be ignored, and problems such as lower cohesive force and adhesive residue during reworking tend to occur.

The weight average molecular weight (Mw), number average molecular weight (Mn), and molecular weight distribution (Mw/Mn) of the acrylic triblock copolymer in the present specification and the below-described acrylic diblock copolymer are values determined by the methods described in the working examples below.

The acrylic triblock copolymer (I) that serves as the main component of the adhesive composition for an optical film in the present invention can be formed from one kind of acrylic block copolymer that meets the above-described requirements (E1) to (E4), or from two or three or more kinds of acrylic block copolymers that meet the above-described requirements (E1) to (E4).

In particular, a desired adhesive composition that has greatly improved reworking properties and durability, suppressed optical unevenness, and an excellent balance among reworking properties, durability, and optical unevenness can be produced more easily by combining, as the acrylic triblock copolymer (I), an acrylic triblock copolymer having a weight average molecular weight (Mw) of 50,000 or more to less than 100,000 which meets the above-described requirements (E1) to (E4) with an acrylic triblock copolymer having a weight average molecular weight (Mw) of 100,000 or more to 300,000 or less which meets the above-described requirements (E1) to (E4), and in particular, by combining these components in a mass ratio of former:latter of 45:55 to 75:25, and especially in a mass ratio of 60:40 to 70:30.

It is preferred that the syndiotacticity of the polymer blocks A1 and A2 constituting the acrylic triblock copolymer (I) be 65% or more, and more preferably 70 to 95%. By setting the syndiotacticity of the polymer blocks A1 and A2 to 65% or more, the durability of the adhesive composition (sustainability of the adhesion properties) improves.

The content of the acrylic triblock copolymer (I) in the adhesive composition of the present invention needs to be, based on the mass of the solids in the adhesive composition (total mass of all the solids in the adhesive composition), 60 mass % or more, preferably 75 mass %, and more preferably 80 mass % or more.

If the content of the acrylic triblock copolymer (I) is less than 60 mass % based on the mass of the solids in the adhesive composition, the cohesive force deteriorates, and the durability of the adhesive composition (sustainability of the adhesive strength) deteriorates.

The adhesive composition of the present invention may optionally include, along with the acrylic triblock copolymer (I), the following acrylic diblock copolymer (II) which meets the requirements (F1), (F2), (F3), and (F4).

The Acrylic Diblock Copolymer (II):
(F1) is represented by the following general formula (2);

$$C\text{-}D \qquad (2)$$

(wherein C represents an alkyl methacrylate polymer block that does not have a functional group that reacts with an isocyanate compound and D represents an alkyl acrylate polymer block that does not have a functional group that reacts with an isocyanate compound);
(F2) has a content of the polymer block D of 40 to 95 mass %;
(F3) has a weight average molecular weight (Mw) of 30,000 to 300,000; and
(F4) has a molecular weight distribution (Mw/Mn) of 1.0 to 1.5.

If the adhesive composition of the present invention includes the acrylic diblock copolymer (II) along with the acrylic triblock copolymer (I), the content of the acrylic diblock copolymer (II) is preferably, based on the mass of the solids in the adhesive composition (total mass of all the solids in the adhesive composition), 3 to 25 mass %, and more preferably 3 to 20 mass %.

If the content of the acrylic diblock copolymer (II) is within the above range, an adhesive composition for an optical film can be obtained which has improved wettability to the adherend, a reduced change in the adhesive strength over time, and better reworking properties. If the content of the acrylic diblock copolymer (II) is more than 25 mass %, the cohesive force of the adhesive composition and the durability (sustaining a long-term adhered state) can deteriorate.

In the acrylic diblock copolymer (II), the polymer block C is preferably formed from an alkyl methacrylate polymer that has a glass transition temperature of 50° C. or more, and the polymer block D is preferably formed from an alkyl acrylate polymer that has a glass transition temperature of −20° C. or less.

It is preferred that the polymer block C in the acrylic diblock copolymer (II) be compatible with the polymer blocks A1 and A2 in the acrylic triblock copolymer (I), which is the main component of the adhesive composition. It is also preferred that the polymer block D in the acrylic diblock copolymer (II) be compatible with the polymer block B in the acrylic triblock copolymer (I).

If so, the polymer block C of the acrylic diblock copolymer (II) is restrained by the restrained phase formed by the polymer blocks A1 and A2 in the acrylic triblock copolymer (I), thereby preventing a deterioration in the cohesive force. Moreover, the polymer block D of the acrylic diblock copolymer (II) exists in a non-restrained phase formed by the polymer block B in the acrylic triblock copolymer (I), so that the wettability at the interface with the adherend in the adhering process improves, providing a stable adhesive strength from the initial stage after lamination.

Examples of the alkyl methacrylate units constituting the polymer block C in the acrylic diblock copolymer (II) include alkyl methacrylate units such as methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, and isobornyl methacrylate. The polymer block C may be formed from one kind or two or more kinds of these alkyl methacrylate units.

Of these, it is preferred that the polymer block C be formed from poly(methyl methacrylate), because the raw material methyl methacrylate can be easily obtained at a low cost and poly(methyl methacrylate) possesses excellent durability and weatherability.

Examples of the alkyl acrylate units constituting the polymer block D in the acrylic diblock copolymer (II) include alkyl acrylate units such as methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate, and stearyl acrylate. The polymer block D may be formed from one kind or two or more kinds of these alkyl acrylate units.

Of these, it is preferred that the polymer block D be formed from one kind or two or more kinds of propyl acrylate, n-butyl acrylate, 2-ethylhexyl acrylate, and n-octyl acrylate units, because the glass transition temperature of the polymer block D will be −20° C. or less, the adhesive composition will exhibit good adhesive strength and tack at low temperatures, and an increase in adhesive strength and a zipping phenomenon during high-speed peeling can be suppressed.

The polymer blocks C and D constituting the acrylic diblock copolymer (II) may contain small amounts of other monomer units (not more than 10 mass % of the polymer blocks) that do not have an isocyanate-reactive functional group, to the extent that the advantageous effects of the present invention are not impaired. Examples of other monomer units which may be contained include (meth)acrylates such as methoxyethyl (meth)acrylate, ethoxyethyl (meth)acrylate, diethylaminoethyl (meth)acrylate, glycidyl (meth)acrylate, and tetrahydrofurfuryl (meth)acrylate; aromatic vinyl monomers such as styrene, α-methylstyrene, and p-methylstyrene; conjugated diene monomers such as butadiene and isoprene; and olefin monomers such as ethylene and propylene. The polymer blocks C and D may optionally contain one kind or two or more kinds of these monomer units.

The content of the polymer block D in the acrylic diblock copolymer (II) is 40 to 95 mass %, and preferably 60 to 95 mass %, based on the mass of the acrylic diblock copolymer (II).

By setting the content of the polymer block D in the acrylic diblock copolymer (II) in the above range, the adhesive strength of the adhesive composition is stabilized. If the content of the polymer block D in the acrylic diblock copolymer (II) is less than 40 mass %, the adhesive strength of the adhesive composition deteriorates. On the other hand, if the content is more than 95 mass %, the relative content of the polymer block C that provides pseudo crosslinking sites is reduced, which causes a lower cohesive force. This can result in a deterioration in the durability of the adhesive composition.

The weight average molecular weight (Mw) of the acrylic diblock copolymer (II) is 30,000 to 300,000. From the perspectives of durability and reworking properties, the weight average molecular weight is preferably 60,000 to 250,000, and more preferably 70,000 to 200,000.

If the weight average molecular weight (Mw) of the acrylic diblock copolymer (II) is less than 30,000, the cohesive force of the adhesive composition is insufficient, so that peeling tends to occur when the optical film that uses the adhesive composition including the acrylic triblock copolymer (I) and the acrylic diblock copolymer (II) is adhered to the adherend or the protective film is adhered to the optical film. Consequently, durability deteriorates. On the other hand, if the weight average molecular weight (Mw) of the acrylic diblock copolymer (II) is more than 300,000, wettability deteriorates, which results in a gradual increase in the adhesive strength during storage of the product, for example. Consequently, reworking becomes more difficult when the optical film or protective film is peeled off and laminated back on to remove wrinkles, air bubbles, entrapment of foreign substances, or misalignment.

The molecular weight distribution (Mw/Mn) of the acrylic diblock copolymer (II) is 1.0 to 1.5. From the perspectives of better cohesive force and less susceptibility to adherend contamination (e.g., adhesive residue, adherence of low-molecular-weight components etc.), the molecular weight distribution (Mw/Mn) is preferably 1.0 to 1.4, more preferably 1.0 to 1.3, and even more preferably 1.0 to 1.2.

The methods for producing the acrylic triblock copolymer (I) and the acrylic diblock copolymer (II) used in the adhesive composition for an optical film of the present invention is not particularly limited. A conventional method may be employed, as long as the acrylic triblock copolymer and the acrylic diblock copolymer meets the aforementioned requirements. In general, living polymerization of monomers, which acts as constituent units, is employed to obtain block copolymers having a narrow molecular weight distribution. Examples of such a living polymerization method include: polymerization using an organic rare earth metal complex as a polymerization initiator (refer to Patent Document 11); anionic polymerization in the presence of a mineral acid salt such as an alkali metal or alkaline earth metal salt using an organic alkali metal compound as a polymerization initiator (refer to Patent Document 12); anionic polymerization in the presence of an organoaluminum compound using an organic alkali metal compound as a polymerization initiator (refer to Patent Document 13); and atom transfer radical polymerization (ATRP) (refer to Non-Patent Document 1).

Among the above production methods, anionic polymerization in the presence of an organoaluminum compound has the advantage that the obtained adhesive composition has a high transparency due to little incorporation of homopolymers, which act as a deactivation component, because of the low level of deactivation during polymerization. Further, the monomer polymerization conversion rate is high. This means that the amount of residual monomers in the product is small, so that production of air bubbles after lamination can be suppressed when the product is used as an adhesive composition for an optical film. Furthermore, the produced methacrylate polymer blocks have a highly syndiotactic molecular structure, so that when the product is used as an adhesive composition for an optical film, there is the advantage that durability is increased. In addition, there is also the advantage that since living polymerization can be performed under relatively mild temperature conditions, industrial production does not require a heavy environmental burden (mainly, the power required for the cooling machines to control the polymerization temperature). Because of these advantages, it is preferred to produce the acrylic triblock copolymer (I) and acrylic diblock copolymer (II) used in the present invention by anionic polymerization in the presence of an organoaluminum compound.

An example of an anionic polymerization method carried out in the presence of the above-described organoaluminum compound is to, in the presence of an organolithium compound and an organoaluminum compound represented by the following general formula (3):

(wherein $R^1$, $R^2$, and $R^3$ are each independently an optionally substituted alkyl group, an optionally substituted cycloalkyl group, an optionally substituted aryl group, an optionally substituted aralkyl group, an optionally substituted alkoxyl group, an optionally substituted aryloxy group, or an N,N-disubstituted amino group; or $R^1$ is any of the foregoing groups and $R^2$ and $R^3$ together form an optionally substituted arylenedioxy group), polymerize a (meth)acrylate by optionally adding to the reaction system an ether compound, such as dimethyl ether, dimethoxyethane, diethoxyethane, and 12-crown-4, or a nitrogen-containing compound, such as triethylamine, N,N,N',N'-tetramethylethylenediamine, N,N,N',N'',N''-pentamethyldiethylenetriamine, 1,1,4,7,10,10-hexamethyltriethylenetetramine, pyridine, and 2,2'-dipyridyl.

Examples of the organolithium compounds include alkyllithiums and alkyldilithiums such as methyllithium, ethyllithium, n-propyllithium, isopropyllithium, n-butyllithium, sec-butyllithium, isobutyllithium, tert-butyllithium, n-pentyllithium, n-hexyllithium, tetramethylenedilithium, pentamethylenedilithium, and hexamethylenedilithium; aryllithiums and aryldilithiums such as phenyllithium, m-tolyllithium, p-tolyllithium, xylyllithium, and lithium naphthalene; aralkyllithiums and aralkyldilithiums such as benzyllithium, diphenylmethyllithium, trityllithium, 1,1-diphenyl-3-methylpentyllithium, α-methylstyryllithium, and a dilithium produced from a reaction between diisopropenylbenzene and butyllithium; lithium amides such as lithium dimethylamide, lithium diethylamide, and lithium diisopropylamide; and lithium alkoxides such as methoxylithium, ethoxylithium, n-propoxylithium, isopropoxylithium, n-butoxylithium, sec-butoxylithium, tert-butoxylithium, pentyloxylithium, hexyloxylithium, heptyloxylithium, octyloxylithium, phenoxylithium, 4-methylphenoxylithium, benzyloxylithium, and 4-methylbenzyloxylithium. These compounds may be used alone, or two or more kinds may be used in combination.

Examples of the organoaluminum compounds represented by the general formula (3) include trialkylaluminums such as trimethylaluminum, triethylaluminum, tri-n-butylaluminum, tri-s-butylaluminum, tri-t-butylaluminum, triisobutylaluminum, tri-n-hexylaluminum, tri-n-octylaluminum, tri-2-ethylhexylaluminum, and triphenylaluminum; dialkylphenoxyaluminums such as dimethyl(2,6-di-tert-butyl-4-methylphenoxy)aluminum, dimethyl(2,6-di-tert-butylphenoxy)aluminum, diethyl(2,6-di-tert-butyl-4-methylphenoxy)aluminum, diethyl(2,6-di-tert-butylphenoxy)aluminum, diisobutyl(2,6-di-tert-butyl-4-methylphenoxy)aluminum, diisobutyl(2,6-di-tert-butylphenoxy)aluminum, di-n-octyl(2,6-di-tert-butyl-4-methylphenoxy)aluminum, and di-n-octyl(2,6-di-tert-butylphenoxy)aluminum; alkyldiphenoxyaluminums such as methylbis(2,6-di-tert-butyl-4-methylphenoxy)aluminum, methylbis(2,6-di-tert-butylphenoxy)aluminum, ethyl[2,2'-methylenebis(4-methyl-6-tert-butylphenoxy)] aluminum, ethylbis(2,6-di-tert-butyl-4-methylphenoxy)aluminum, ethyl[2,2'-methylenebis(4-methyl-6-tert-butylphenoxy)] aluminum, isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)] aluminum, n-octylbis(2,6-di-tert-butyl-4-methylphenoxy)aluminum, n-octylbis(2,6-di-tert-butylphenoxy)aluminum, and n-octyl[2,2'-methylenebis(4-methyl-6-tert-butylphenoxy)] aluminum; alkoxydiphenoxyaluminums such as methoxybis(2,6-di-tert-butyl-4-methylphenoxy)aluminum, methoxybis(2,6-di-tert-butylphenoxy)aluminum, methoxy[2,2'-methylenebis(4-methyl-6-tert-butylphenoxy)] aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)] aluminum, isopropoxybis(2,6-di-tert-butyl-4-methylphenoxy)aluminum, isopropoxybis(2,6-di-tert-butylphenoxy)aluminum, isopropoxy[2,2'-methylenebis(4-methyl-6-tert-butylphenoxy)] aluminum, tert-butoxybis(2,6-di-tert-butyl-4-methylphenoxy)aluminum, tert-butoxybis(2,6-di-tert-butylphenoxy)aluminum, and tert-butoxy[2,2'-methylenebis (4-methyl-6-tert-butylphenoxy)] aluminum; and triphenoxyaluminums such as tris(2,6-di-tert-butyl-4-methylphenoxy)aluminum and tris(2,6-diphenylphenoxy)aluminum. Of these organoaluminum compounds, isobutylbis(2,6-di-tert-butyl-4-methylphenoxy) aluminum, isobutylbis(2,6-di-tert-butylphenoxy)aluminum, and isobutyl[2,2'-methylenebis(4-methyl-6-tert-butylphenoxy)] aluminum are particularly preferable because they are easily handled and can promote polymerization of acrylates under relatively mild temperature conditions without being deactivated. These compounds may be used alone, or two or more kinds may be used in combination.

The formation of physical pseudo crosslinks derives from the microphase-separated structure formed by the acrylic triblock copolymer (I). Based on the components of the respective polymer blocks and the degree of polymerization, microphase-separated structures generally form a sphere structure, a cylinder structure, a lamellar structure, or a mutually-continuous structure. In the case of the adhesive composition for an optical film of the present invention, the polymer blocks A1 and A2 in the matrix formed from the polymer blocks B can form a sphere structure or a cylinder structure, while the polymer blocks A1 and A2, and the polymer block B can form a lamellar structure or a mutually-continuous structure. From the perspective of adhesive strength, it is preferred that the microphase-separated structure sphere structure formed by the acrylic triblock copolymer (I) be a sphere structure, a cylinder structure, or a mutually-continuous structure. From the perspectives of adhesive strength and durability, a cylinder structure or a mutually-continuous structure is preferred.

Since the adhesive composition for an optical film of the present invention has the acrylic triblock copolymer (I), which does not react with the isocyanate compound, as a main component, the adhesive composition does not undergo chemical crosslinking, but rather forms a microphase-separated structure in which physical crosslinks are formed. Consequently, there is little unevenness in the adhesion performance, and a stable adhesive strength and retention can be exhibited.

The isocyanate compound used in the adhesive composition of the present invention is a compound that has one or two or more isocyanate groups in the molecule. It is preferred to use an isocyanate compound having two or more, and especially preferred three or more, isocyanate groups, because the interfacial adhesion properties of the adhesive composition with the optical film substrate increase.

Examples of the isocyanate compound that can be used in the adhesive composition of the present invention include aliphatic isocyanate compounds, alicyclic isocyanate compounds, aromatic isocyanate compounds, adducts of these isocyanate compounds (especially, polyisocyanate compounds) with a polyol, and isocyanurate compound adducts. One kind or a mixture of two or more kinds of these can be used.

Specific examples of isocyanate compounds that can be used in the adhesive composition of the present invention include aliphatic diisocyanate compounds such as butylene diisocyanate and hexamethylene diisocyanate; alicyclic diisocyanate compounds such as cyclopentylene diisocyanate, cyclohexylene diisocyanate, and isophorone diisocyanate; aromatic diisocyanate compounds such as 2,4-tolylene diisocyanate, 4,4'-diphenylmethane diisocyanate, and xylylene diisocyanate; polyisocyanate compounds formed by adding a diisocyanate compound to a polyol, such as a trimethylolpropane/tolylene diisocyanate trimer adduct and a trimethylolpropane/hexamethylene diisocyanate trimer adduct; and isocyanate adducts such as an isocyanurate adduct of hexamethylene diisocyanate. These isocyanate compounds may be used alone, or two or more kinds may be used in combination.

Among the above isocyanate compounds, the trimethylolpropane/tolylene diisocyanate trimer adduct is sold under the trade name "Coronate L," the trimethylolpropane/hexamethylene diisocyanate trimer adduct is sold under the trade name "Coronate HL," an isocyanurate adduct of tolylene diisocyanate is sold under the trade names "Coronate 2030" and "Coronate 2233," and the isocyanurate adduct of hexamethylene diisocyanate is sold under the trade name "Coronate HX", all of which are manufactured by Nippon Polyurethane Industry Co., Ltd.

The adhesive composition of the present invention contains 0.0015 mass % or more to less than 0.35 mass % of the isocyanate compound in terms of the isocyanate group content in the isocyanate compound based on the mass of the solids in the adhesive composition (total mass of the solids included in the adhesive composition).

The isocyanate compound forms a chemical bond at the interface with the optical film substrate, so that the adhesive strength of the adhesive composition to the substrate increases. However, this can cause the cohesive force of the adhesive composition to deteriorate. If the content of the isocyanate compound is less than 0.0015 mass % in terms of isocyanate group content based on the mass of the solids in the adhesive composition, a sufficient adhesive strength to the substrate cannot be obtained. On the other hand, if this isocyanate group content is 0.35 mass % or more, the cohesive force of the adhesive composition deteriorates, which causes problems to occur, such as a deterioration in durability, and harm to the coating surface properties due to sediment produced during storage of the adhesive composition solution. From the perspective of maintaining a good balance among the adhesive strength to the substrate, cohesive force, and durability, the content of the isocyanate compound in the adhesive composition is, in terms of isocyanate group content in the isocyanate compound, preferably 0.009 to 0.27 mass %, more preferably 0.018 to 0.24 mass %, and even more preferably 0.05 to 0.22 mass %.

The isocyanate group content in the isocyanate compound based on the mass of the solids in the adhesive composition can be determined from the following equation (1).

$$C_{NCO} \text{ (mass \%)} = [\{W_{iso} \times n(42/M_{iso})\}/Ws] \times 100 \quad (1)$$

(wherein $C_{NCO}$ represents the isocyanate group content (mass %) in the isocyanate compound based on the mass of the solids in the adhesive composition, $W_{iso}$ represents the amount (mass) of isocyanate compound in the adhesive composition, $M_{iso}$ represents the molecular weight of the isocyanate compound, n denotes the number of isocyanate groups in the isocyanate compound, and Ws represents the content (mass) of the solids in the adhesive composition.)

Since the adhesive composition of the present invention includes an isocyanate compound, the isocyanate compound included in the adhesive composition forms a chemical bond with a functional group on the optical film substrate side at the interface between the optical film substrate and the adhesive composition. Consequently, despite the fact that the adhesive composition has the non-crosslinking type acrylic triblock copolymer (I) as a main component, the conventional problem of insufficient adhesive strength to the substrate is improved on, and a higher durability is exhibited.

Specifically, since the acrylic triblock copolymer (I) that is the main component forming the adhesive composition for an optical film of the present invention does not include an isocyanate-reactive functional group in the molecule such as a carboxyl group, a hydroxyl group, a thiol group, an amino group, or an amide group, a chemical reaction with the isocyanate compound does not occur. On the other hand, since an isocyanate-reactive functional group such as a carboxyl group, a hydroxyl group, a thiol group, an amino group, and an amide group is present on the surface of the optical film or the protective film for an optical film, the isocyanate compound in the adhesive composition reacts with the surface of the optical film or the protective film for an optical film, thereby increasing the interfacial adhesive strength of the adhesive composition with the optical film or the protective film for an optical film.

The reaction between the isocyanate compound and the reactive functional group depends on the structure of the isocyanate compound. For example, tolylene diisocyanate generally is more reactive than hexamethylene diisocyanate, and an isocyanurate adduct of an isocyanate compound is more reactive than an isocyanate adduct of trimethylolpropane.

If the isocyanate compound has a highly reactive structure, the aging time until the interfacial adhesive strength of the adhesive composition with the optical film or the protective film for an optical film increases tends to shorten. On the other hand, because the reactivity is high, the isocyanate compound can react with moisture in the adhesive composition, and thus become deactivated before coating. From this perspective, it is preferred that the moisture content in the adhesive composition be 4,000 ppm or less, more preferably 3,000 ppm or less, even more preferably 2,000 ppm or less, and especially preferably 1,000 ppm or less. To shorten the aging time while suppressing deactivation of the isocyanate compound as a result of the isocyanate compound reacting with moisture or other reactive components in the adhesive composition, it is necessary to control the reactivity of the isocyanate compound while maintaining the decreased moisture content in the adhesive composition. From this perspective, preferred examples of the isocyanate compound include the trimethylolpropane/tolylene diisocyanate trimer adduct "Coronate L," the isocyanurate adduct of hexamethylene diisocyanate "Coronate HX", and the isocyanurate adducts of tolylene diisocyanate "Coronate 2030" and "Coronate 2233."

As a technique to increase the reactivity of the isocyanate compound and shorten the aging time until the interfacial adhesive strength of the adhesive composition with the optical film or the protective film for an optical film increases, a reaction catalyst can be used. Examples of the reaction catalyst include amine catalysts, DBU (1,8-diazo-bicyclo[5,4,0] undecene-7), metal catalysts and the like. Specific examples include, but are not limited to, tetramethylbutane diamine, 1,4-diaza-bicyclo[2,2,2] octane, dibutyltin dilaurate, tin octoate, N-ethylmorpholine, triethylamine, N,N,N',N'-tetramethyl-1,3-butane diamine, triethylene diamine, cobalt naphthenate, tin(I) chloride, tetra-n-butyltin, tin(II) chloride, trimethyltin hydroxide, dimethyltin dichloride, and di-n-butyltin dilaurate. One kind or two or more kinds of these may be added.

The adhesive composition for an optical film of the present invention may optionally include an antistatic agent. If the adhesive composition does include an antistatic agent, an antistatic ability can be imparted to the adhesive composition for an optical film.

Examples of the antistatic agent used in the adhesive composition for an optical film of the present invention include an ion conductive agent formed from an alkali metal salt, an ionic liquid, a surfactant, a conductive polymer, a metal oxide, carbon black, and a carbon nano-material. Of these, from the perspectives of permanent conductivity and absence of color, it is preferred to use an ion conductive agent formed from an alkali metal salt and/or an ionic liquid.

Examples of the ion conductive agent formed from an alkali metal salt include metal salts of lithium, sodium, and potassium. Specific examples includes alkali metal salts formed from an alkali metal cation, such as $Li^+$, $Na^+$, and $K^+$, and an anion, such as $Cl^-$, $Br^-$, $I^-$, $BF_4^-$, $PF_6^-$, $SCN^-$, $ClO_4^-$, $CF_3SO_3^-$, $(CF_3SO_2)_2N^-$, and $(CF_3SO_2)_3C^-$. Of these, it is preferred to use a lithium salt, such as LiBr, LiI, LiSCN, $LiClO_4$, $L1BF_4$, and $LiPF_6$, or a fluorine-containing organic lithium salt, such as $LiCF_3SO_3$, $Li(CF_3SO_2)_2N$, and $Li(CF_3SO_2)_3C$, and more preferred to use $LiClO_4$, $LiCF_3SO_3$, $Li(CF_3SO_2)_2N$, and $Li(CF_3SO_2)_3C$.

The term "ionic liquid" refers to a molten salt (an ionic compound) that is a liquid at room temperature (25° C.). As the ionic liquid, it is preferred to use a nitrogen-containing onium salt, a sulfur-containing onium salt, and a phosphorus-containing onium salt. From the perspective of obtaining an especially excellent antistatic ability, it is preferred to use a nitrogen-containing onium salt, a sulfur-containing onium salt, and a phosphorus-containing onium salt, in which the organic cation component represented by the following general formulae (i) to (iv) is combined with the anion component.

[Formula 1]

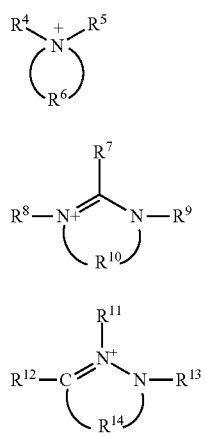

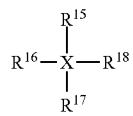

In the above general formula (i), $R^4$ and $R^5$ each independently represent a hydrogen atom or a monovalent hydrocarbon group having 1 to 16 carbon atoms that may include a hetero atom, and $R^6$ represents a divalent hydrocarbon group having 4 to 20 carbon atoms that may include a hetero atom. However, in the general formula (i), $R^5$ does not exist when the nitrogen atom N on a ring formed from the nitrogen atom N and the divalent group $R^6$ includes a double bond.

In the above general formula (ii), $R^7$, $R^8$, and $R^9$ each independently represent a hydrogen atom or a monovalent hydrocarbon group having 1 to 16 carbon atoms that may include a hetero atom, and $R^{10}$ represents a divalent hydrocarbon group having 2 to 20 carbon atoms that may include a hetero atom.

In the above general formula (iii), $R^{11}$, $R^{12}$, and $R^{13}$ each independently represent a hydrogen atom or a monovalent hydrocarbon group having 1 to 16 carbon atoms that may include a hetero atom, and $R^{14}$ represents a divalent hydrocarbon group having 2 to 20 carbon atoms that may include a hetero atom.

In the above general formula (iv), X represents a nitrogen atom, a sulfur atom, or a phosphorous atom, and $R^{15}$, $R^{16}$, $R^{17}$, and $R^{18}$ each independently represent a divalent hydrocarbon group having 1 to 20 carbon atoms that may include a hetero atom. However, $R^{18}$ does not exist if X is a sulfur atom.

Examples of the cation represented by the above general formula (i) include a pyridinium cation, a piperidinium cation, a pyrrolidinium cation, a cation having a pyrroline skeleton, and a cation having a pyrrole skeleton. Specific examples include a 1-ethylpyridinium cation, a 1-butylpyridinium cation, a 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, a 1,1-dimethylpyrrolidinium cation, a 1-ethyl-1-methylpyrrolidinium cation, a 1-methyl-1-propylpyrrolidinium cation, a 2-methyl-1-pyrroline cation, a 1-ethyl-2-phenylindole cation, a 1,2-dimethylindole cation, and a 1-ethylcarbazole cation.

Examples of the cation represented by the above general formula (ii) include an imidazolium cation, a tetrahydropyrimidinium cation, and a dihydropyrimidinium cation. Specific examples include a 1,3-dimethylimidazolium cation, a 1,3-diethylimidazolium cation, a 1-ethyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, and a 1,2,3,4-tetramethyl-1,6-dihydropyrimidinium cation.

Examples of the cation represented by the above general formula (iii) include a pyrazolium cation and a pyrazolinium cation. Specific examples include a 1-methylpyrazolium cation, a 3-methylpyrazolium cation, and a 1-ethyl-2-methylpyrazolinium cation.

Examples of the cation represented by the above general formula (Iv) include a tetraalkylammonium cation, a trialkylsulfonium cation, a tetraalkylphosphonium cation, and cations in which a part of the above alkyl group is substituted with an alkenyl group, an alkoxyl group, or an epoxy group.

Specific examples include a tetramethylammonium cation, a tetraethylammonium cation, a tetrabutylammonium cation, a tetrahexylammonium cation, an N,N-dimethyl-N,N-dipropylammonium cation, an N,N-dimethyl-N,N-dihexylammonium cation, an N,N-dipropyl-N,N-dihexylammonium cation, a trimethylsulfoxonium cation, a triethylsulfononium cation, a tributylsulfononium cation, a trihexylsulfononium cation, a tetramethylphosphonium cation, a tetraethylphosphonium cation, a tetrabutylphosphonium cation, a tetrahexylphosphonium cation, a diallyldimethylammonium cation, asymmetric tetraalkylammonium cations such as a triethylmethylammonium cation, a tributylethylammonium cation, a trimethyldecylammonium cation, an N,N-diethyl-N-methyl-N-(2-methoxyethyl)ammonium cation, a glycidyltrimethylammonium cation, an N,N-dimethyl-N-ethyl-N-propylammonium cation, an N,N-dimethyl-N-ethyl-N-butylammonium cation, an N,N-dimethyl-N-ethyl-N-pentylammonium cation, an N,N-dimethyl-N-ethyl-N-hexylammonium cation, an N,N-dimethyl-N-ethyl-N-heptylammonium cation, an N,N-dimethyl-N-ethyl-N-nonylammonium cation, an N,N-dimethyl-N-propyl-N-butylammonium cation, an N,N-dimethyl-N-propyl-N-pentylammonium cation, an N,N-dimethyl-N-propyl-N-hexylammonium cation, an N,N-dimethyl-N-propyl-N-heptylammonium cation, an N,N-dimethyl-N-butyl-N-hexylammonium cation, an N,N-dimethyl-N-butyl-N-heptylammonium cation, an N,N-dimethyl-N-pentyl-N-hexylammonium cation, a trimethylheptylammonium cation, an N,N-diethyl-N-methyl-N-propylammonium cation, an N,N-diethyl-N-methyl-N-pentylammonium cation, an N,N-diethyl-N-methyl-N-heptylammonium cation, an N,N-diethyl-N-propyl-N-pentylammonium cation, a triethylmethylammonium cation, a triethylpropylammonium cation, a triethylpentylammonium cation, a triethylheptylammonium cation, an N,N-dipropyl-N-methyl-N-ethylammonium cation, an N,N-dipropyl-N-methyl-N-pentylammonium cation, an N,N-dipropyl-N-butyl-N-hexylammonium cation, an N,N-dibutyl-N-methyl-N-pentylammonium cation, an N,N-dibutyl-N-methyl-N-hexylammonium cation, a trioctylmethylammonium cation, and an N-methyl-N-ethyl-N-propyl-N-pentylammonium cation, trialkylsulfonium cations such as a diethylmethylsulfonium cation, a dibutylethylsulfonium cation, and a dimethyldecylsulfonium cation, a triethylmethylphosphonium cation, a tributylethylphosphonium cation, and a trimethyldecylphosphonium cation.

The anion component in the ionic liquid is not limited, as long as it can turn into an ionic liquid. Examples thereof may include $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, and $(CF_3SO_2)(CF_3CO)N^-$.

As the ionic liquid, a combination of ionic liquids appropriately selected from among the above-described cation component and the anion component may be used.

Specific examples of the ionic liquid include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl)imide, 1-butyl-3-methylpyridinium bis(pentafluoroethanesulfonyl)imide, 1-hexylpyridinium tetrafluororoborate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, and 1-ethyl-3-methylimidazolium tris(trifluoromethanesulfonyl)imide.

Further specific examples of the ionic liquid include 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, and glycidyltrimethylammonium trifluoromethanesulfonate.

Further specific examples of the ionic liquid include glycidyltrimethylammonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethane sulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis (trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethane sulfonyl)imide, N,N-dimethyl-N-propyl-N-pentylammonium bis(trifluoromethanesulfonyl)imide, and N,N-dimethyl-N-propyl-N-hexylammonium bis(trifluoromethanesulfonyl)imide.

Further specific examples of the ionic liquid include N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, and N-methyl-N-ethyl-N-propyl-N-pentylammonium bis(trifluoromethane sulfonyl)imide.

When using a surfactant as the antistatic agent, any of a cationic surfactant, an anionic surfactant, an amphoteric surfactant, or a nonionic surfactant can be used. In this case, examples of the cationic surfactant include a quaternary ammonium salt type, a phosphonium salt type, and a sulfonium salt type. Examples of the anionic surfactant include a carboxylic acid type, a sulfonate type, a sulfate type, a phosphate type, and a phosphite type. Examples of the amphoteric surfactant include a sulfobetaine type, an alkylbetaine type, and an alkylimidazolium betaine type. Examples of the nonionic surfactant include a polyhydric alcohol derivative, a β-cyclodextrin inclusion compounds, a sorbitan fatty acid monoester, a sorbitan fatty acid diester, a polyalkylene oxide derivative, and an amine oxide.

When using a conductive polymer as the antistatic agent, it is preferred to use a conductive polymer that has excellent optical properties, appearance, and antistatic effect, and yet can sufficiently exhibit an antistatic effect even during heating and wet heat. Examples of such a conductive polymer include polymers such as polyaniline, polythiophene, polypyrrole, and polyquinoxaline. One kind or two or more kinds of these may be used. Of these, it is preferred to use polyaniline and polythiophene, which can be easily turned into a UV-curable conductive polymer, a water-soluble conductive polymer, or a water-dispersible conductive polymer.

When using a metal oxide as the antistatic agent, it is preferred to use a metal oxide such as a tin oxide, an antimony oxide, an indium oxide, and a zinc oxide. Of these, it is more preferred to use a tin oxide. Examples of a tin oxide include tin oxide, antimony-doped tin oxide, indium-doped tin oxide, aluminum-doped tin oxide, tungsten-doped tin oxide, a complex of titanium oxide-cerium oxide-tin oxide, and a complex of titanium oxide-tin oxide. As the metal oxide, it is preferred to use fine particles having a particle shape or a needle shape. The average particle size of these fine particles is preferably about 1 to 100 nm, and more preferably 2 to 50 nm.

Examples of antistatic agents other than those described above include conductive carbon materials, such as acetylene black, Ketjen black, natural graphite, synthetic graphite, titanium black, and carbon nano-materials, homopolymers or a copolymer of monomers having a cationic (a quaternary salt etc.), an amphoteric (a betaine compound etc.), an anionic (a sulfonate etc.), and/or a nonionic (glycerin etc.) ion conductive group (e.g., an ion conductive polymer such as a polymer having a structural unit derived from acrylate or methacrylate having a quaternary ammonium salt group), and a material formed by alloying a hydrophilic polymer, such as a polyethylene methacrylate copolymer, with an acrylic resin. Examples of the above carbon nano-material include carbon nanotubes, carbon nanohorns, carbon nanowalls, and fullerenes. Of these, it is preferred to use carbon nanotubes.

If the adhesive composition of the present invention includes an antistatic agent, from the perspective of antistatic effect and the like, the content of the antistatic agent is preferably, based on the mass of the solids in the adhesive composition, 0.1 to 10 mass %, more preferably 0.15 to 8 mass %, and even more preferably 0.2 to 6 mass %.

When including an antistatic agent in the adhesive composition of the present invention, from the perspective of having an even better antistatic effect, it is preferred to further include a polyol compound as an ion conductor.

Among the above-described antistatic agents, when using an ion conductive agent formed from an alkali metal salt and/or an ionic liquid, combining with a polyol compound makes the antistatic effect even better. In particular, when using an ion conductive agent formed from an alkali metal salt, to sufficiently exhibit the antistatic effect, a polyol compound has to be used.

The polyol compound that is used with the antistatic agent is a compound having a structure in which at least a glycol is condensed thereto. Examples thereof include a polyester polyol, a polyether polyol, a polycaprolactone polyol, a polycarbonate polyol, and a sunflower oil-based polyol. One kind of polyol may be used, or two or more kinds of polyol may be used in combination. Of these, from the perspective of excellent compatibility with the acrylic triblock copolymer (I), it is preferred to use a polyester polyol or a polyether polyol.

The above polyester polyol may be obtained by reacting a diol component and a dicarboxylic acid component. Examples thereof may include a polyester diol obtained by subjecting one kind or two or more kinds of diol component (especially, an aliphatic diol component) and one kind or two or more kinds of dicarboxylic acid component to a condensation reaction or a transesterification reaction. Herein, examples of the diol component include ethylene glycol, diethylene glycol, propylene glycol, 1,4-butanediol, 1,6-hexanediol, neopentyl glycol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, and octadecanediol. Examples of the dicarboxylic acid component include an aliphatic dicarboxylic acid, an alicyclic dicarboxylic acid, an aromatic dicarboxylic acid, and a dicarboxylic acid derivate thereof, such as an acid anhydride or lower alkyl ester, such as succinic acid, methylsuccinic acid, adipic acid, pimelic acid, azelaic acid, sebacic acid, 1,12-dodecanedioic acid, 1,14-tetradecanedioic acid, dimer acid, 2-methyl-1,4-cyclohexanedicarboxylic acid, 2-ethyl-1,4-cyclohexanedicarboxylic acid, terephthalic acid, isophthalic acid, phthalic acid, 1,4-naphthalenedicarboxylic acid, and 4,4'-biphenyldicarboxylic acid.

Examples of the polyether polyol include polyalkylene glycols such as polyethylene glycol, polypropylene glycol, and polytetramethylene ether glycol, and derivatives thereof; polyalkylene glycol block copolymers such as a triblock copolymer of polypropylene glycol-polyethylene glycol-polypropylene glycol, a diblock copolymer of polypropylene glycol-polyethylene glycol, and a triblock copolymer of polyethylene glycol-polypropylene glycol-polyethylene glycol; polyalkylene glycol random copolymers in which a propylene glycol unit and an ethylene glycol unit are randomly joined; and polyethylene-glycol-modified silicone oil in which polyethylene glycol is linked to silicone oil. The ends of the polyether polyol may be kept as a hydroxyl group, may be substituted with an alkyl group, a phenyl group and the like, or may be joined to another structure via an ester bond.

When including a polyol compound in the adhesive composition of the present invention, from the perspectives of exhibiting an excellent antistatic function, the content of the polyol compound is, based on the mass of the solids in the adhesive composition, preferably 0.05 to 9.5 mass %, more preferably 0.1 to 7.5 mass %, and even more preferably 0.15 to 5.5 mass %. If the content of the polyol compound is more than 9.5 mass %, the adhesive strength tends to deteriorate due to the polyol compound bleeding onto the adherend. Further, when using an ion conductive agent formed from an alkali metal salt as the antistatic agent, if the content of the polyol compound is less than 0.05 mass %, it becomes more difficult for a sufficient antistatic effect to be exhibited.

Although the hydroxyl groups in the polyol compound react with the isocyanate compound, if the adhesive composition of the present invention includes the above-described amount of polyol compound, the content of the polyol compound in the adhesive composition is low. Moreover, the hydroxyl groups in the polymer polyol, such as the polyester polyol or polyether polyol as described above, are present only on the ends of the polymer polyol. Further, as seen in terms of the whole adhesive composition, the amount of hydroxyl groups derived from the polyol compound is very small. Consequently, even if the polyol compound is included in the adhesive composition, hardly any gelation and the like of the adhesive composition occurs due to a reaction between the isocyanate compound and the polyol compound before the adhesive composition is used. However, by adding the polyol compound to the adhesive composition immediately before the adhesive composition is used, the reaction between the isocyanate compound and the polyol compound can be completely prevented prior to the adhesive composition being used.

For a conventional pressure sensitive adhesive, if an antistatic agent is added to the pressure sensitive adhesive, a substantial deterioration in adhesive strength and durability is generally seen due to deterioration of the cohesive force of the pressure sensitive adhesive, and the antistatic agent bleeding onto the surface. Further, a similar phenomenon may also occur for a pressure sensitive adhesive in which an acrylic block copolymer is used. However, with the adhesive composition for an optical film of the present invention, the isocyanate compound included in the adhesive composition acts to increase the interfacial adhesive strength of the adhesive composition with the optical film, due to the isocyanate compound reacting with the surface of the optical film and adherend. In addition, since the isocyanate compound suppresses bleeding of the antistatic agent onto the surface, deterioration of the adhesion properties can be prevented even if the antistatic agent is included. Consequently, excellent adhesion properties and antistatic performance can both be achieved.

The adhesive composition for an optical film of the present invention may optionally also include a silane coupling agent to increase the adhesion properties with glass under high humidity. The silane coupling agent has an alkoxy group, such as a methoxy group and an ethoxy group. The alkoxy groups can hydrolyze to form silanol groups, some of which fuse together. These fused silanol groups are fixed to the surface of the glass by adsorption, a hydrogen bond, or a chemical bond, thereby increasing the adhesion durability.

In the adhesive composition for an optical film of the present invention, a conventionally-known silane coupling agent may be used. Specific examples of silane coupling agents that can be used in the adhesive composition of the present invention include 3-glycidoxypropyltrimethoxysilane, 2-(3,4-epoxycyclohexyl)-ethyl trimethoxysilane, 3-glycidoxypropylmethyldiethoxysilane, 3-glycidoxypropyltriethoxysilane, 3-mercaptopropyltrimethoxysilane, vinyltrimethoxysilane, vinyltriethoxysilane, 3-methacryloxypropyltrimethoxysilane, 3-methacryloxypropyltriethoxysilane, 3-aminopropyltrimethoxysilane, 3-aminopropyltriethoxysilane, 3-isocyanatepropyltriethoxysilane, and 3-acetoacetatepropyltrimethoxysilane. These may be used alone, or two or more kinds may be used in combination.

When including a silane coupling agent in the adhesive composition of the present invention, to improve durability reliability and adhesion reliability, the content of the silane coupling agent is, based on the mass of the solids in the adhesive composition, preferably 0.01 to 3 mass %, and more preferably 0.1 to 1 mass %.

The adhesive composition for an optical film of the present invention may optionally include a tackifier resin.

Including a tackifier resin in the adhesive composition for an optical film of the present invention facilitates adjustment of the tack, adhesive strength, and retention. As the tackifier resin, any tackifier resin that is conventionally used in an adhesive composition may be used. Examples thereof include natural resins, such as rosin resins and terpene resins; and synthetic resins such as petroleum resins, coumarone-indene resins, phenolic resins, xylene resins and styrene resins. These tackifier resins may be used alone, or two or more kinds may be used in combination.

Of these tackifier resins, from the perspectives of a high compatibility with the acrylic triblock copolymer (I) and a stable adhesive strength, it is preferred to use a terpene resin, such as a hydrogenated terpene resin or a terpene phenol resin; a rosin resin, such as a hydrogenated rosin ester, a disproportionated rosin ester, or a polymerized rosin; a petroleum resin such as C5/C9 petroleum resin or an aromatic petroleum resin; and a styrene resin, such as an α-methylstyrene polymer or a styrene/α-methylstyrene copolymer. These may be used alone, or two or more kinds may be used in combination.

To achieve a high adhesive strength, the softening point of the tackifier resin is preferably 50 to 150° C.

When including a tackifier resin in the adhesive composition for an optical film of the present invention, the content of the tackifier resin may be appropriately selected based on the type of adherend or the like. However, based on the total mass of all the solids included in the adhesive composition, generally, the content of the tackifier resin is preferably 25 mass % or less, more preferably 20 mass % or less, and even more preferably 10 mass % or less. If the content of the tackifier resin is more than this, problems can arise, such as a deterioration in the cohesive force or the occurrence of an adhesive residue during reworking.

The adhesive composition for an optical film of the present invention may optionally include one kind or two or more kinds of plasticizer or other additive.

Examples of plasticizers that can optionally be included in the adhesive composition for an optical film of the present invention include aliphatic acid esters, for example phthalates such as dibutyl phthalate, di-n-octyl phthalate, bis-2-ethylhexyl phthalate, di-n-decyl phthalate, and diisodecyl phthalate, adipates such as bis-2-ethylhexyl adipate and di-n-octyl adipate, sebacates such as bis-2-ethylhexyl sebacate and di-n-butyl sebacate, and azelates such as bis-2-ethylhexyl azelate; paraffins such as chlorinated paraffin; epoxy polymer plasticizers such as epoxidized soybean oil and epoxidized linseed oil; phosphates such as trioctyl phosphate and triphenyl phosphate; phosphites such as triphenyl phosphite; acrylic oligomers such as poly(n-butyl (meth)acrylate) and poly(2-ethylhexyl (meth)acrylate); polybutene; polyisobutylene; polyisoprene; process oils; and naphthene oils. These may be used alone, or two or more kinds may be used in combination.

When including a plasticizer in the adhesive composition for an optical film of the present invention, the content of the plasticizer is, based on the total mass of all the solids included in the adhesive composition, preferably 25 mass % or less, and more preferably 10 mass % or less. If the added amount of the plasticizer is more than this, problems can arise, such as a deterioration in the cohesive force or the occurrence of an adhesive residue during reworking.

The adhesive composition for an optical film of the present invention may optionally include components other than those described above. Examples include an antioxidant or a UV absorber to further improve weatherability, heat resistance, and oxidation resistance; an inorganic powder filler such as calcium carbonate, titanium oxide, mica and talc; and a fibrous filler such as glass fibers and organic reinforcing fibers. The adhesive composition of the present invention may also optionally include a light-diffusing agent, a near infrared absorber, a colorant and the like as an additive to impart a desired function to the adhesive composition layer.

If the adhesive composition for an optical film of the present invention includes, in addition to the acrylic triblock copolymer (I) and the isocyanate compound, the acrylic diblock copolymer (II), the antistatic agent, the polyol compound, the silane coupling agent, the tackifier resin, the plasticizer, and other additives, the total content of the components (the other solids) other than the acrylic triblock copolymer (I) and the isocyanate compound is, based on the total mass of all the solids included in the adhesive composition, less than 40 mass %, preferably 25 mass % or less, and more preferably 20 mass % or less.

The adhesive composition for an optical film of the present invention may be a solution type pressure sensitive adhesive or a solid pressure sensitive adhesive. A solution type pressure sensitive adhesive may be prepared by dissolving the acrylic triblock copolymer (I), the isocyanate compound, and the optional other components (e.g., the acrylic diblock copolymer (II), the antistatic agent, the polyol compound, the silane coupling agent, the tackifier resin, the plasticizer, and other additives) in an organic solvent such as toluene, ethyl acetate, butyl acetate or methyl ethyl ketone, at a relatively low temperature (generally about 0 to 70° C.).

Further, a solid pressure sensitive adhesive may be prepared by mixing at a temperature usually in the range of 100 to 250° C. using a known kneading apparatus, such as a kneader-ruder, an extruder, a mixing roll, or a Banbury mixer.

Of these, it is preferred to use the adhesive composition for an optical film of the present invention as a solution type pressure sensitive adhesive. If the adhesive composition for an optical film of the present invention is used as a solution type pressure sensitive adhesive, a thin pressure sensitive adhesive layer having a uniform thickness can be formed on a substrate or an adherend without high-temperature heating while preventing deformation, alteration in properties, orientation, or residual stress in the substrate or the adherend.

In particular, the adhesive composition for an optical film of the present invention exhibits a low solution viscosity even when dissolved in an organic solvent at a high solid concentration. This enables a solution viscosity in the range of 1,000 to 4,000 mPa·s as measured with a B-type viscometer at 25° C. to be achieved, even when the adhesive composition is dissolved in toluene at a high solid concentration of 45 mass %. More preferably, this solution viscosity is in the range of 1,500 to 3,500 mPa·s, and still more preferably in the range of 2,000 to 3,500 mPa·s. Therefore, the adhesive composition for an optical film of the present invention can provide a solution type pressure sensitive adhesive having a higher solid concentration than a conventional one (a solution type pressure sensitive adhesive having a solid concentration of not less than 35 mass %) while reducing the used amount of organic solvent. This solution type pressure sensitive adhesive having a high solid concentration has excellent handling properties during coating and processability (reduction of drying burden, increased coating speed, elimination of the aging step etc.) in spite of the high solid concentration.

If the adhesive composition for an optical film of the present invention is used as a solution type pressure sensitive adhesive, from perspectives such as the coating properties, handling properties, and processability of the solution type pressure sensitive adhesive, it is preferred that the adhesive composition have a total solid content of 20 to 60 mass %, and especially 35 to 55 mass %, based on the total mass of the solution type pressure sensitive adhesive, wherein the total solid content includes the acrylic triblock copolymer (I), the isocyanate compound, and the optionally-used acrylic diblock copolymer (II), the antistatic agent, the polyol compound, the silane coupling agent, the tackifier resin, the plasticizer, and other additives.

Since the acrylic triblock copolymer (I), which is the main component forming the adhesive composition for an optical film of the present invention, does not react with the isocyanate compound, the chemical crosslinking reaction step that was required for conventional crosslinking acrylic pressure sensitive adhesives can be omitted from the production steps of the pressure sensitive adhesive product. Consequently, productivity can be greatly improved. Further, because the acrylic triblock copolymer (I), which is the main component forming the adhesive composition for an optical film of the present invention, does not react with the isocyanate compound, the adhesive composition has excellent storage stability, which allows long-term storage as is or recovery and reuse of the adhesive composition which is left in the adhesive tank during production of a pressure sensitive adhesive type optical film.

Conventional crosslinking acrylic adhesive compositions are mainly two-pack type pressure sensitive adhesives containing a main agent and a crosslinking agent. After the two agents are mixed together, the crosslinking reaction proceeds even at room temperature, which causes the adhesion properties or coating properties to vary unless the adhesive is used immediately after mixing.

Further, in a conventional acrylic pressure sensitive adhesive for an optical film, the crosslinking reaction proceeds during the drying step or product storage, which causes uneven crosslinking to occur based on the drying conditions (e.g., temperature, air flow, and line speed) or storage conditions (e.g., storage duration and temperature). Consequently, there is the problem that the adhesive performance of the product varies. However, the adhesive composition for an optical film of the present invention does not cause such a problem. This is because the isocyanate compound included in the adhesive composition for an optical film of the present invention does not react with the acrylic triblock copolymer (I), which is the main component forming the adhesive composition, so that a selective chemical reaction occurs at the interface between the optical film and the adhesive composition. Consequently, there is an increase in only the interfacial adhesive strength, with the bulk properties of the adhesive composition hardly changing.

The pressure sensitive adhesive type optical film and protective film for an optical film using the adhesive composition for an optical film of the present invention can be produced by, for example, the following methods. (i) A method in which the adhesive composition for an optical film of the present invention is coated on the above-described optical film or protective film for an optical film. (ii) A method in which the adhesive composition for an optical film of the present invention is pre-coated on a release film, such as a release-treated polyethylene terephthalate film, and the release film is laminated on the optical film or protective film for an optical film to transfer the pressure sensitive adhesive layer onto the optical film or protective film for an optical film.

A common plastic material may be used for the optical film. In such a case, examples of the plastic material include polyethylene terephthalate (PET), triacetyl cellulose (TAC), polyvinyl alcohol (PVA), polycarbonate, cycloolefin resin, styrene/methyl methacrylate copolymer resin (MS resin), acrylic resin, and acrylic UV-curable resin. These materials are selectively used in order to achieve the functions of the optical film. For example, a film used for a polarizing plate, which is an optical film, is formed by adsorbing and orienting a dichroic pigment (mainly iodine) on PVA. Because PVA films alone have poor strength, typically a TAC film is laminated on either side of the PVA to function as a protective film for suppressing expansion or shrinkage under a wet heat or hot environment. Further, polarizing plates can sometimes have a retardation function. In such a case, the TAC protective films are coated with discotic liquid crystals. Alternatively, a retardation film obtained by stretching polycarbonate or cycloolefin resin is used instead of the TAC acting as a protective film. Prism sheets are PET films on which prisms are formed from photocuring acrylic resin or the like. Diffusion plates contain MS resin or polycarbonate. Diffusion films are PET films or polycarbonate films wherein the surface is coated with a bead layer, is surface-processed, or contains an internal diffuser. Some light guide plates are manufactured by processing the surface of an acrylic plate by a special processing so that the light incident through the edge faces is emitted in a uniform manner from the main surface. A reflection sheet formed from a PET film is used on the lower side of the light guide plate.

Examples of the plastic material used for the adhesive composition for an optical film include polyethylene terephthalate (PET), polypropylene (PP), polyethylenes (PE) such as high density polyethylene (HDPE), low density polyethylene (LDPE), and linear polyethylene (L-LDPE), polyvinyl chloride (PVC), and ethylene-vinyl acetate copolymer (EVA). These plastics may be used as a single layer or in the form of two or more layers.

Usually, pressure sensitive adhesive type optical films are produced by coating a pressure sensitive adhesive on a PET separator, subjecting the coated pressure sensitive adhesive to a drying step, and then laminating with the various optical films described above that have not yet been adhered. If the adhesive composition for an optical film of the present invention is used in the production steps of a pressure sensitive adhesive type optical film, a large amount of the isocyanate compound included in the adhesive composition is still present on the pressure sensitive adhesive surface after the drying step. By forming a chemical bond with the optical film surface during lamination, the interfacial adhesive strength of the pressure sensitive adhesive with the optical film can be selectively increased.

Consequently, an optical film having the adhesive composition for an optical film of the present invention as a pressure sensitive adhesive layer has excellent adhesion properties for the pressure sensitive adhesive layer with the optical film substrate. As a result, when adhering the optical film to an adherend or adhering a protective film to the optical film, peeling can be carried out at a suitable peeling strength without leaving an adhesive residue, and reworking properties are excellent. Further, the adhesive strength does not deteriorate and air bubbles are not produced even when the film is exposed to heating or wet heat, and good adhesion properties can be maintained for a long time.

In an optical film or a protective film for an optical film in which the adhesive composition for an optical film of the present invention is applied, since the bulk properties of the adhesive composition do not greatly change, there is little increase in adhesive strength over time. Further, even if the optical film or protective film for an optical film is adhered to an adherend for a long time, such a film can be easily peeled without leaving an adhesive residue.

The pressure sensitive adhesive type optical film and protective film for an optical film having a pressure sensitive adhesive layer formed from the adhesive composition for an optical film of the present invention can be produced without performing a crosslinking step by forming at least one pressure sensitive adhesive layer formed from the adhesive composition for an optical film of the present invention on a part or the whole of one or both surfaces of an optical film used in various kinds of image display devices, such as a liquid crystal display device, a PDP, an organic EL display device, and electronic paper, or a protective film for such an optical film. Examples of the optical films in such a case include a polarizing film, a polarizing plate, a retardation film, a retardation plate, a view angle enlarging film, a brightness increasing film, an antireflection film, an anti-glare film, a color filter, a light guide plate, a diffusion film, a prism sheet, an electromagnetic wave shielding film, a near-infrared absorption film, and functional composite optical films having a plurality of optical functions. Examples of protective films for an optical film include films that are adhered to the above various optical films for protective purposes.

In the pressure sensitive adhesive type optical film and protective film for an optical film produced using the adhesive composition for an optical film of the present invention, the acrylic triblock copolymer (I) which is the main component forming the adhesive composition is not chemically crosslinked. Therefore, such a pressure sensitive adhesive type optical film or protective film for an optical film can be shipped as is as a product that can be adhered to a liquid crystal panel or other adherend, without having to undergo the annealing or aging that was required when using a crosslinking acrylic pressure sensitive adhesive. Consequently, productivity is excellent.

The reason why the pressure sensitive adhesive type optical film and protective film for an optical film produced using the adhesive composition for an optical film of the present invention have excellent reworking properties is that since the acrylic triblock copolymer (I), which is the main component forming the adhesive composition, does not react with the isocyanate compound and there is little change over time in the bulk properties, there is little change over time in the adhesive strength. In contrast, for a conventional acrylic pressure sensitive adhesive for an optical film that contains an isocyanate compound as a crosslinking agent, a chemical crosslinking reaction of the polymer serving as the main component proceeds during storage of the product, which causes adhesive strength to increase, thus making reworking difficult.

In applications where reworkability is required, it is preferred that the 180° peeling adhesive strength when reworking a polarizing plate from a liquid crystal cell be generally 0.05 to 20 N/25 mm, more preferably 0.1 to 15 N/25 mm, and still more preferably 3 to 10 N/25 mm. The adhesive composition for an optical film of the present invention can stably maintain this preferred 180° peeling adhesive strength.

Image display devices are generally configured from a laminate of a plurality of the above optical films. It is preferred that the pressure sensitive adhesive used for laminating the optical films to a glass substrate or the like and for laminating different kinds of optical film can be adhered while tracking the difference in the thermal expansion coefficient (dimensional change caused by increasing temperature) between the optical films and the glass substrate or the difference in thermal expansion coefficient (dimensional change caused by increasing temperature) between the different kinds of optical films. Among optical films, polarizing plates in particular often shrink greatly under hot conditions because the thermal stress on the stretched PVA causes the polarizing plate to try to revert to its original state (pre-stretching state). Therefore, pressure sensitive adhesives that are used to adhere a polarizing plate to a liquid crystal cell or that are used in another optical film that will be adhered to the polarizing plate need to be capable of tracking dimensional changes by relaxing the stress. The stress on the polarizing plate causes stress birefringence (retardation). If such a polarizing plate is mounted on a liquid crystal display, problems such as optical unevenness (leakage of white light from the periphery of the screen when the liquid crystal display is a black display) can arise. In such a case, trackability with respect to dimensional change needs to be high in order to reduce optical unevenness. The adhesive composition of the present invention has properties that can sufficiently meet this requirement.

Further, if the optical film is a polarizing plate in which a wide view film (WV film) provided with a retardation function for enlarging the view angle of a liquid crystal display is used as a PVA protective film, since discotic liquid crystals are coated on the surface of the WV film that is in contact with the pressure sensitive adhesive, the surface tension is lower than ordinary TAC, the adhesion properties of the pressure sensitive adhesive to the WV film deteriorate, and problems tend to arise in the reworking properties and durability with a conventional pressure sensitive adhesive. In contrast, the adhesive composition of the present invention has a sufficiently high adhesive strength to a WV film, and has properties that can sufficiently meet the reworking properties and durability.

EXAMPLES

The present invention will now be described in more detail based on the following examples. However, the present invention is not limited to the following working examples.

First, synthesis examples relating to the acrylic triblock copolymer (I) (acrylic triblock copolymers (Ia) to (Id)) and the acrylic diblock copolymer (II) (acrylic diblock copolymer (IIa)) used in the below examples and comparative examples will be described.

In the following synthesis examples, each of the block copolymers were produced using chemicals that had been dried and purified by ordinary methods.

Analysis of the molecular weight, the molecular weight distribution, the composition, and the tacticity (rr) of the methyl methacrylate polymer block (polymer block A) of the block copolymers synthesized in the following synthesis examples, and measurement of the glass transition temperature and the polymerization conversion rate of each polymer block were carried out based on the following methods.

(1) Measurement of number average molecular weight (Mn), weight average molecular weight (Mw), and molecular weight distribution (Mw/Mn) by gel permeation chromatography (GPC)

Apparatus: Gel permeation chromatograph (HLC-8020) manufactured by Tosoh Corporation Columns: TSK gel GMHXL, G4000HXL, and G5000HXL, manufactured by Tosoh Corporation connected in series Eluent: Tetrahydrofuran Eluent flow rate: 1.0 ml/min Column temperature: 40° C.

Detecting method: Differential refractive index (RI)

Calibration curve: Prepared using standard polystyrene (2) Measurement of the content of each copolymer component based on proton nuclear magnetic resonance ($^1$H-NMR) spectroscopy Apparatus: Nuclear magnetic resonance apparatus (JNM-LA400) manufactured by JEOL Ltd.

Solvent: Deuterated chloroform

In the $^1$H-NMR spectra, signals near 3.6 ppm and 4.0 ppm were assigned to the ester group (—O—C$\underline{H}_3$) of the methyl methacrylate unit and the ester group (—O—C$\underline{H}_2$—CH$_2$—CH$_2$—CH$_3$) of the n-butyl acrylate unit, respectively. The contents of the copolymer components were determined based on the ratio of the integral values.

(3) Tacticity (rr) analysis based on carbon nuclear magnetic resonance ($^{13}$C-NMR) spectroscopy Apparatus: Nuclear magnetic resonance apparatus (JNM-LA400) manufactured by JEOL Ltd.

Solvent: Deuterated chloroform

In the $^{13}$C-NMR spectra, signals near 44.5 ppm, 44.8 ppm, and 45.5 ppm were assigned to the quaternary carbon atom in the methyl methacrylate polymer block, corresponding to the tacticity rr, mr and mm, respectively. The tacticity rr was determined based on the ratio of the integral values. The tacticity may be also measured by $^1$H-NMR. For the block copolymers used in the examples and comparative examples of the present invention, $^{13}$C-NMR was employed because it was difficult by $^1$H-NMR to separate the signals derived from the methyl methacrylate polymer from the signals derived from the n-butyl acrylate polymer.

(4) Measurement of Glass Transition Temperature (Tg)

The extrapolated initial temperature (Tgi) from a curve obtained by DSC measurement was taken as the glass transition temperature (Tg).

Apparatus: DSC-822, manufactured by Mettler-Toledo K.K.

Conditions: Rate of temperature increase 10° C./min (5) Measurement of conversion rate of charged monomer based on gel chromatography (GC) (polymerization conversion rate)

Device: Gas chromatograph GC-14A, manufactured by Shimadzu Corporation

Column: "Inert Cap 1" manufactured by GL Sciences Inc., (df=0.4 μm, 0.25 mm, I.D.×60 m)

Analysis conditions: Injection 300° C., detector 300° C., 60° C., (held 0 min)→increase at 5° C./min→100° C. (held 0 min)→increase at 15° C./min→300° C. (held 2 min)

Synthesis Example 1

Synthesis of Acrylic Triblock Copolymer (Ia)

(1) A 2 L three-necked flask was provided with a three-way cock, and then the contents of the flask were purged with nitrogen. Then, at room temperature, the flask was charged with 868 g of toluene, 43.4 g of 1,2-dimethoxyethane, and 60.0 g of a toluene solution which contained 40.2 mmol of isobutyl bis(2,6-di-t-butyl-4-methylphenoxy)aluminum. The flask was further charged with 3.68 g of a cyclohexane/n-hexane mixed solution containing 6.37 mmol of sec-butyllithium, and then charged with 49.9 g of methyl methacrylate. The reaction solution was yellow at first and became colorless after being stirred for 60 minutes at room temperature. The methyl methacrylate polymerization conversion rate at this stage was 99.9% or more. The internal temperature of the polymer solution was cooled to −30° C., and 212 g of n-butyl acrylate was added dropwise over 2 hours. After the completion of the dropwise addition, the mixture was stirred at −30° C. for 5 minutes. The n-butyl acrylate polymerization conversion rate at this stage was 99.9% or more. Furthermore, 49.9 g of methyl methacrylate was added and the mixture was stirred at room temperature overnight. The polymerization reaction was then terminated by adding 3.50 g of methanol. The methyl methacrylate polymerization conversion rate at this stage was 99.9% or more. The resultant reaction solution was poured into 15 kg of methanol, whereby a white precipitate was deposited. The white precipitate was then recovered by filtration, and dried to obtain 310 g of a block copolymer (hereinafter, referred to as "acrylic triblock copolymer (Ia)").

(2) The acrylic triblock copolymer (Ia) obtained in (1) above was determined based on $^1$H-NMR measurement and GPC measurement to be a triblock copolymer consisting of polymethyl methacrylate-poly(n-butyl acrylate)-polymethyl methacrylate, having a weight average molecular weight (Mw) of 63,000, a number average molecular weight (Mn) of 50,000, and a molecular weight distribution (Mw/Mn) of 1.26. Further, the contents of the respective polymer blocks in the acrylic triblock copolymer (Ia) were 32.0 mass % for the methyl methacrylate polymer blocks (the total of the two polymer blocks A), and 68.0 mass % for the n-butyl acrylate polymer block (polymer block B). In addition, the glass transition temperatures of the respective polymer blocks in the obtained acrylic triblock copolymer (Ia) and the tacticity (rr) of the polymethyl methacrylate polymer blocks (polymer block A) were determined based on the above-described methods. The results are shown in the following Table 1.

Synthesis Example 2

Synthesis of Acrylic Triblock Copolymer (Ib)

(1) A 2 L three-necked flask was provided with a three-way cock, and then the contents of the flask were purged with nitrogen. Then, at room temperature, the flask was charged with 868 g of toluene, 43.4 g of 1,2-dimethoxyethane, and 60.0 g of a toluene solution which contained 40.2 mmol of isobutyl bis(2,6-di-t-butyl-4-methylphenoxy)aluminum. The flask was further charged with 2.07 g of a cyclohexane/n-hexane mixed solution containing 3.54 mmol of sec-butyllithium, and then charged with 36.6 g of methyl methacrylate. The reaction solution was yellow at first and became colorless after being stirred for 60 minutes at room temperature. The methyl methacrylate polymerization conversion rate at this stage was 99.9% or more. The internal temperature of the polymer solution was cooled to −30° C., and 251.9 g of n-butyl acrylate was added dropwise over 2 hours. After the completion of the dropwise addition, the mixture was stirred at −30° C. for 5 minutes. The n-butyl acrylate polymerization conversion rate at this stage was 99.9% or more. Furthermore, 36.6 g of methyl methacrylate was added and the mixture was stirred at room temperature overnight. The polymerization reaction was then terminated by adding 3.50 g of methanol. The methyl methacrylate polymerization conversion rate at this stage was 99.9% or more. The resultant reaction solution was poured into 15 kg of methanol, whereby a white precipitate was deposited. The white precipitate was then recovered by filtration, and dried to obtain 320 g of a block copolymer (hereinafter, referred to as "acrylic triblock copolymer (Ib)").

(2) The acrylic triblock copolymer (Ib) obtained in (1) above was determined based on $^1$H-NMR measurement and GPC measurement to be an acrylic triblock copolymer consisting of polymethyl methacrylate-poly(n-butyl acrylate)-polymethyl methacrylate, having a weight average molecular weight (Mw) of 110,000, a number average molecular weight (Mn) of 92,000, and a molecular weight distribution (Mw/Mn) of 1.20. Further, the contents of the respective polymer blocks in the acrylic triblock copolymer (Ib) were 22.5 mass % for the methyl methacrylate polymer blocks (the total of the two polymer blocks A), and 77.5 mass % for the n-butyl acrylate polymer block (polymer block B). In addition, the glass transition temperatures of the respective polymer blocks in the obtained acrylic triblock copolymer (Ib) and the tacticity (rr) of the polymethyl methacrylate polymer blocks (polymer block A) were determined based on the above-described methods. The results are shown in the following Table 1.

Synthesis Example 3

Synthesis of Acrylic Triblock Copolymer (Ic)

(1) A 2 L three-necked flask was provided with a three-way cock, and then the contents of the flask were purged with nitrogen. Then, at room temperature, the flask was charged with 868 g of toluene, 43.4 g of 1,2-dimethoxyethane, and 60.0 g of a toluene solution which contained 40.2 mmol of isobutyl bis(2,6-di-t-butyl-4-methylphenoxy)aluminum. The flask was further charged with 3.03 g of a cyclohexane/n-hexane mixed solution containing 5.17 mmol of sec-butyllithium, and then charged with 79.9 g of methyl methacrylate. The reaction solution was yellow at first and became colorless after being stirred for 60 minutes at room temperature. The methyl methacrylate polymerization conversion rate at this stage was 99.9% or more. The internal temperature of the polymer solution was cooled to −30° C., and 155.3 g of n-butyl acrylate was added dropwise over 2 hours. After the completion of the dropwise addition, the mixture was stirred at −30° C. for 5 minutes. The n-butyl acrylate polymerization conversion rate at this stage was 99.9% or more. Furthermore, 79.9 g of methyl methacrylate was added and the mixture was stirred at room temperature overnight. The polymerization reaction was then terminated by adding 3.50 g of methanol. The methyl methacrylate polymerization conversion rate at this stage was 99.9% or more. The resultant reaction solution was poured into 15 kg of methanol, whereby a white precipitate was deposited. The white precipitate was then recovered by filtration, and dried to obtain 310 g of a block copolymer (hereinafter, referred to as "acrylic triblock copolymer (Ic)").

(2) The acrylic triblock copolymer (Ic) obtained in (1) above was determined based on $^1$H-NMR measurement and GPC measurement to be a triblock copolymer consisting of polymethyl methacrylate-poly(n-butyl acrylate)-polymethyl methacrylate, having a weight average molecular weight (Mw) of 67,000, a number average molecular weight (Mn) of 61,000, and a molecular weight distribution (Mw/Mn) of 1.10. Further, the contents of the respective polymer blocks in the acrylic triblock copolymer (Ic) were 50.7 mass % for the methyl methacrylate polymer blocks (the total of the two polymer blocks A), and 49.3 mass % for the n-butyl acrylate polymer block (polymer block B). In addition, the glass transition temperatures of the respective polymer blocks in the obtained acrylic triblock copolymer (Ic) and the tacticity (rr) of the polymethyl methacrylate polymer blocks (polymer block A) were determined based on the above-described methods. The results are shown in the following Table 1.

Synthesis Example 4

Synthesis of Acrylic Triblock Copolymer (Id)

(1) A 2 L three-necked flask was provided with a three-way cock, and then the contents of the flask were purged with nitrogen. Then, at room temperature, the flask was charged with 868 g of toluene, 43.4 g of 1,2-dimethoxyethane, and 60.0 g of a toluene solution which contained 40.2 mmol of isobutyl bis(2,6-di-t-butyl-4-methylphenoxy)aluminum. The flask was further charged with 1.80 g of a cyclohexane/ n-hexane mixed solution containing 3.06 mmol of sec-butyllithium, and then charged with 50.3 g of methyl methacrylate. The reaction solution was yellow at first and became colorless after being stirred for 60 minutes at room temperature. The methyl methacrylate polymerization conversion rate at this stage was 99.9% or more. The internal temperature of the polymer solution was cooled to −30° C., and 224 g of n-butyl acrylate was added dropwise over 2 hours. After the completion of the dropwise addition, the mixture was stirred at −30° C. for 5 minutes. The n-butyl acrylate polymerization conversion rate at this stage was 99.9% or more. Furthermore, 50.3 g of methyl methacrylate was added and the mixture was stirred at room temperature overnight. The polymerization reaction was then terminated by adding 3.50 g of methanol. The methyl methacrylate polymerization conversion rate at this stage was 99.9% or more. The resultant reaction solution was poured into 15 kg of methanol, whereby a white precipitate was deposited. The white precipitate was then recovered by filtration, and dried to obtain 320 g of a triblock copolymer (hereinafter, referred to as "acrylic triblock copolymer (Id) ").

(2) The acrylic triblock copolymer (Id) obtained in (1) above was determined based on $^1$H-NMR measurement and GPC measurement to be a triblock copolymer consisting of polymethyl methacrylate-poly(n-butyl acrylate)-polymethyl methacrylate, having a weight average molecular weight (Mw) of 132,000, a number average molecular weight (Mn) of 101,000, and a molecular weight distribution (Mw/Mn) of 1.31. Further, the contents of the respective polymer blocks in the acrylic triblock copolymer (Id) were 31.3 mass % for the methyl methacrylate polymer blocks (the total of the two polymer blocks A), and 68.7 mass % for the n-butyl acrylate polymer block (polymer block B). In addition, the glass transition temperatures of the respective polymer blocks in the obtained acrylic triblock copolymer (Id) and the tacticity (rr) of the polymethyl methacrylate polymer blocks (polymer block A) were determined based on the above-described methods. The results are shown in the following Table 1.

Synthesis Example 5

Synthesis of Acrylic Diblock Copolymer (IIa)

(1) A 2 L three-necked flask was provided with a three-way cock, and then the contents of the flask were purged with nitrogen. Then, at room temperature, the flask was charged with 868 g of toluene, 43.4 g of 1,2-dimethoxyethane, and 30.0 g of a toluene solution which contained 20.1 mmol of isobutyl bis(2,6-di-t-butyl-4-methylphenoxy)aluminum. The flask was further charged with 3.31 g of a cyclohexane/ n-hexane mixed solution containing 4.30 mmol of sec-butyllithium, and then charged with 21.5 g of methyl methacrylate. The reaction solution was yellow at first and became colorless after being stirred for 60 minutes at room temperature. The methyl methacrylate polymerization conversion rate at this stage was 99.9 or more. The internal temperature of the polymer solution was cooled to −30° C., and 291 g of n-butyl acrylate was added dropwise over 2 hours. After the completion of the dropwise addition, the mixture was stirred at −30° C. for 5 minutes, and the polymerization reaction was then terminated by adding 3.5 g of methanol. The n-butyl acrylate polymerization conversion rate at this stage was 99.9% or more. Next, the resultant reaction solution was poured into 15 kg of methanol, whereby a colorless oily substance was sedimentated. The solution was then decanted, and the obtained sediment was dried to obtain 295 g of a diblock copolymer (hereinafter, referred to as "acrylic diblock copolymer (IIa)").

(2) The acrylic diblock copolymer (IIa) obtained above was determined based on $^1$H-NMR measurement and GPC measurement to be a diblock copolymer consisting of polymethyl methacrylate-poly(n-butyl acrylate)-polymethyl methacrylate, having a weight average molecular weight (Mw) of 92,000, a number average molecular weight (Mn) of 76,000, and a molecular weight distribution (Mw/Mn) of 1.21. Further, the content percentages of the respective polymer blocks in the acrylic diblock copolymer (IIa) were 6.9 mass % for the methyl methacrylate polymer block (polymer block C), and 93.1 mass % for the n-butyl acrylate polymer block (polymer block D).

The details of the acrylic triblock copolymers (Ia) to (Id) and the acrylic diblock copolymer (IIa) synthesized in the above Synthesis Examples 1 to 5 are collectively shown in the following Table 1.

TABLE 1

| | Block Copolymer | | | | |
|---|---|---|---|---|---|
| | Ia (Synthesis Example 1) | Ib (Synthesis Example 2) | Ic (Synthesis Example 3) | Id (Synthesis Example 4) | IIa (Synthesis Example 5) |
| Structure[1] | A-B-A | A-B-A | A-B-A | A-B-A | A-B |
| Weight Average Molecular Weight (Mw) | 63,000 | 110,000 | 67,000 | 132,000 | 92,000 |
| Number Average Molecular Weight (Mn) | 50,000 | 92,000 | 61,000 | 101,000 | 76,000 |
| Molecular Weight Distribution (Mw/Mn) | 1.26 | 1.20 | 1.10 | 1.31 | 1.21 |
| Polymer Block A Content (mass %) | 32.0 | 22.5 | 50.7 | 31.3 | 6.9 |
| Polymer Block B Content (mass %) | 68.0 | 77.5 | 49.3 | 68.7 | 93.1 |
| Polymer Block A Tg (° C.) | 101.8 | 104.3 | 109.0 | 114.7 | — |
| Polymer Block B Tg (° C.) | −44.6 | −45.8 | −45.1 | −46.0 | −46.6 |
| Polymer Block A Tacticity (rr) (%) | 70.5 | 68.8 | 68.3 | 72.7 | — |

[1]Block Copolymer Structure: A-B-A: Triblock copolymer formed from poly(methyl methacrylate)-poly(n-butyl methacrylate)-poly(methyl methacrylate) A-B: Diblock copolymer formed from poly(methyl methacrylate)-poly(n-butyl methacrylate)

Examples and comparative examples will be described below.

The details of the isocyanate compound, antistatic agent, polyol compound, and silane coupling agent used in the following examples and comparative examples are as follows.

Isocyanate Compound

Isocyanate Compound (1):

A trimethyol propane/tolylene diisocyanate trimer adduct ("Coronate L", manufactured by Nippon Polyurethane Industry Co., Ltd.) (ethyl acetate solution, concentration 75 mass %)

Isocyanate Compound (2):

An isocyanurate adduct of tolylene diisocyanate ("Coronate 2233", manufactured by Nippon Polyurethane Industry Co., Ltd.) (ethyl acetate solution, concentration 40 mass %)

Antistatic Agent:

Antistatic Agent (1)

A mixture of an ion conductive agent formed from a lithium perchlorate salt and a side-chain polyether modified silicone oil (polyol compound) ("PC6860" (trade name), manufactured by Marubishi Oil Chemical Co., Ltd.)

Antistatic Agent (2)

A mixture of an ion conductive agent formed from $Li(CF_3SO_2)_2N$ and a polyalkylene oxide polyol (polyol compound) ("Sankonol PEO-20R" (trade name), manufactured by Sanko Chemical Industry Co., Ltd.)

Antistatic Agent (3)

A mixture of an ion conductive agent formed from $Li(CF_3SO_2)_2N$ and dibutoxyethoxyethyl adipate (polyol compound) ("Sankonol O862-20R" (trade name), manufactured by Sanko Chemical Industry Co., Ltd.)

Antistatic Agent (4)

An ionic liquid formed from 1-butyl-3-methylpyridinium cations and $(CF_3SO_2)_2N$ anions ("CIL312" (trade name), manufactured by Japan Carlit Co., Ltd.)

Antistatic Agent (5)

An ionic liquid formed from 1-butyl-3-methylpyridinium cations and fluorine-containing anions ("CIL319" (trade name), manufactured by Japan Carlit Co., Ltd.)

Polyol Compound:

Polyester polyol adipate ("Kuraray Polyol P1010" (trade name), manufactured by Kuraray Co., Ltd.)

Silane Coupling Agent:

γ-Glycidoxy propyl trimethoxy silane ("KBM-403" (trade name), manufactured by Shin-Etsu Chemical Co. Ltd.)

In the following examples and comparative examples, the measurement or evaluation of the adhesive strength, creep test (retention test), wet heat creep test (retention test), and the surface resistance was carried out based on the following methods unless otherwise noted.

Further, the glass plate used in the following examples and comparative examples was, unless otherwise noted, a soda lime glass plate that had been washed with an alkali.

[Adhesive Strength]

The pressure sensitive adhesive type optical films produced in the following examples and comparative examples were cut into a size 25 mm wide and 200 mm long and stuck onto a glass plate serving as an adherend. Alternatively, the produced pressure sensitive adhesive type optical films were stuck onto the discotic liquid crystal coating face of a WV film (wide view film) (a film for enlarging the view angle of a liquid crystal display produced by coating a cellulose triacetate film serving as a support with discotic liquid crystals) (manufactured by Fujifilm Corporation) or the discotic liquid crystal coating face of a polarizing plate A (a 200 μm-thick polarizing plate having a TAC/PVA/WV film layer structure with a WV film as a protective film, in which the face in contact with the adhesive composition is a discotic liquid crystal coating face). The films were stored at under conditions of 23° C. and 50% RH for 24 hours or 7 days. Then, the 180° peeling adhesive strength was measured at a peeling rate of 30 mm/min or 300 mm/min. The films were stuck to an air face of the glass plate by rolling a 2 kg rubber roller back and forth across the glass plate twice. Measurement was carried out with conditions other than those described above based on JIS Z0237.

In the measurement of the adhesive strength to the above glass plate, a commercially-available soda lime glass plate that contained an alkali component and that had been washed using an alkali was used as the glass plate for the following Examples 1 and 2, Examples 9 to 13, Comparative Examples 1 and 2, and Comparative Examples 7 to 13. For Examples 7 and 8, and Comparative Examples 5 and 6, an alkali-free glass plate for a liquid crystal display that did not contain an alkali component was used as the glass plate.

[Creep Test (Retention Test)]

The pressure sensitive adhesive type optical films produced in the following examples or comparative examples were cut into a size 25 mm (horizontal direction: perpendicular direction to the load direction)×10 mm (vertical direction: same direction as the load direction) to produce a test piece. The test piece was stuck to a glass substrate serving as an adherend. A 1 kg load was applied on the test piece, and then the positional shift of the test piece 1,000 minutes later at a temperature of 90° C. was measured based on JIS Z0237. At this stage, it was confirmed whether the load had dropped due to the test piece having peeled from the glass plate after 10 minutes, after 90 minutes, and after 1,000 minutes. Based on the evaluation criteria shown in the following Table 2, the durability (adhesion retention) of the pressure sensitive adhesive (adhesive composition) was scored.

In this creep test, four test pieces having the same size as described above were collected from the same pressure sensitive adhesive type optical film. The above test was carried out on all four of these test pieces, and the average value of the four test pieces was used as the evaluated durability (adhesion retention) score.

This test was carried out to check the durability of the pressure sensitive adhesive (adhesive composition) under heating. Absence of positional shift of the test piece, or a longer duration until the test piece fell, indicates better durability of the pressure sensitive adhesive (adhesive composition).

TABLE 2

Creep Test Evaluation Criteria

| Evaluation | Evaluation Details |
|---|---|
| 5 | Test piece had not dropped 90 minutes after load being applied. Even after 1,000 minutes, misalignment of test piece 0.1 mm or less and no dropping. Durability extremely good (excellent). |
| 4 | Test piece had not dropped 90 minutes after load being applied. Even after 1,000 minutes, although misalignment of test piece was greater than 0.1 mm, no dropping. Durability very good (very good). |
| 3 | Test piece had not dropped 90 minutes after load being applied. Dropping occurred between after 90 minutes but before 1,000 minutes. Durability good (good). |
| 2 | Test piece dropped between 10 to 90 minutes after load being applied. Durability poor (poor). |
| 1 | Test piece dropped less than 10 minutes after load being applied. Durability bad (bad). |

[Wet Heat Creep Test (Retention Test)]

The pressure sensitive adhesive type optical films produced in the following examples or comparative examples were cut into a size 25 mm (horizontal direction: perpendicular direction to the load direction)×10 mm (vertical direction: same direction as the load direction) to produce a test piece. The test piece was stuck to a glass substrate serving as an adherend. A 1 kg load was applied on the test piece, and then the positional shift of the test piece 1,000 minutes later at a temperature of 70° C. and under 95% RH humidity conditions was measured based on JIS Z0237. At this stage, it was confirmed whether the load had dropped due to the test piece having peeled from the glass plate after 10 minutes, after 90 minutes, and after 1,000 minutes. Based on the evaluation criteria shown in the above Table 2, the durability was scored.

In this wet heat creep test, four test pieces having the same size as described above were collected from the same pressure sensitive adhesive type optical film. The above test was carried out on all four of these test pieces, and the average value of the four test pieces was used as the evaluated durability (adhesion retention) score.

This test was carried out to check the durability of the pressure sensitive adhesive (adhesive composition) under high-temperature, high humidity conditions. Absence of positional shift of the test piece, or a longer duration until the test piece fell, indicates better durability (wet heat resistance) of the pressure sensitive adhesive (adhesive composition).

[Surface Resistance]

The pressure sensitive adhesive type optical films produced in the following examples or comparative examples were cut into a 10 cm×10 cm size. The cut films were left for 3 hours under conditions of 23° C. and 40% RH. A voltage of 500 V was applied to the films for 60 seconds, and then the surface resistance was measured. Measurement of the surface resistance was carried out using an R834 Ultra High Resistance Meter and a Sample Chamber TR42 manufactured by Advantest Corporation, under conditions of 23° C. and 40% RH, with other conditions set according to JIS K6911.

A smaller surface resistance indicates a lower charge. The surface resistance is preferably $10^{13}$ Ω/square or less, and more preferably $10^{12}$ Ω/square or less.

[Moisture Content of Adhesive Composition (ppm)]

The adhesive composition moisture content (ppm) was measured using a coulometric titrator moisture measurement apparatus (CA-100, manufactured by Mitsubishi Chemical Corporation) based on the Karl Fischer method under conditions of a temperature of 23° C. and a humidity of 40% RH.

Examples 1 and 2 and Comparative Examples 1 and 2

(1) The acrylic triblock copolymers (Ia), (Ib), and (Id) produced in the above Synthesis Examples 1, 2, and 4 were mixed in a percentage of, respectively, 65.0 parts by mass, 25.0 parts by mass, and 10.0 parts by mass as shown in the following Table 3 (for a total of 100 parts by mass of acrylic triblock copolymer (I)). The resultant mixture was added with the isocyanate compound (1) ("Coronate L", manufactured by Nippon Polyurethane Industry Co., Ltd.) in the amount shown in the following Table 3 (Examples 1 and 2, and Comparative Example 2), or not added with the isocyanate compound (1) (Comparative Example 1), to produce an adhesive composition. Then, the adhesive composition was diluted with ethyl acetate so that the overall solid content was 35 mass %, and shaken to produce each of the adhesive composition solutions.

(2) Each of the adhesive composition solutions obtained in the above (1) was coated on a polyethylene terephthalate film (thickness 50 μm) (PET substrate film) using a bar coater, and then dried at 60° C. for 30 minutes to produce each of the pressure sensitive adhesive type optical films each formed from an adhesive composition layer and a PET substrate film. The thickness of the adhesive composition layer in each pressure sensitive adhesive type optical film was as shown in the following Table 3.

(3) Each of the pressure sensitive adhesive type optical films obtained in the above (2) was measured for its adhesive strength to a glass plate (glass adhesive strength) and its adhesive strength to a WV film (WV adhesive strength) based on the above-described method. The results are shown in the following Table 3.

(4) Each of the pressure sensitive adhesive type optical films obtained in the above (2) was subjected to a creep test based on the above-described method. The results are shown in the following Table 3.

TABLE 3

|  | Example 1 | Example 2 | Comparative Example 1 | Comparative Example 2 |
|---|---|---|---|---|
| Composition of Adhesive Composition | | | | |
| Block Copolymer (parts by mass) | | | | |
| Acrylic Triblock Copolymer (Ia) (Mw = 63,000) | 65.0 | 65.0 | 65.0 | 65.0 |
| Acrylic Triblock Copolymer (Ib) (Mw = 110,000) | 25.0 | 25.0 | 25.0 | 25.0 |
| Acrylic Triblock Copolymer (Id) (Mw = 132,000) | 10.0 | 10.0 | 10.0 | 10.0 |
| Isocyanate Compound: | | | | |
| Isocyanate Compound (1)[1] (parts by mass) | 0.67 | 1.33 | 0 | 2.67 |
| (Active Componen: Content) (parts by mass)[2] | (0.5) | (1.0) | (0) | (2.0) |
| (NCO Content)[3] | (0.09 mass %) | (0.18 mass %) | (0 mass %) | (0.36 mass %) |
| Adhesive Optical Film | | | | |
| Thickness of Optical Film Layer Composition Layer (μm) | 21.9 | 21.8 | 22.0 | 21.7 |
| Adhesive Strength: | | | | |
| Glass Adhesive Strength (N/25 mm)[4] | | | | |
| Storage Time / Peeling Rate | | | | |
| 24 hr / 30 mm/min | —[4] | 15.9 | 14.4 | —[4] |
| 24 hr / 300 mm/min | —[4] | 19.8 | 14.5 | —[4] |
| 7 d / 30 mm/min | —[4] | 15.7 | 10.4 | —[4] |
| 7 d / 300 mm/min | —[4] | 17.3 | 10.8 | —[4] |
| WV Film Adhesive Strength (N/25 mm) | | | | |
| Storage Time / Peeling Rate | | | | |
| 24 hr / 30 mm/min | 12.1 | 18.1 | 11.2 | 8.3 |
| 24 hr / 300 mm/min | 13.7ss[6] | 19.8 | 11.4 | 1.4ss[6] |
| 7 d / 30 mm/min | —[5] | 26.7 | 12.8 | —[5] |
| 7 d / 300 mm/min | —[5] | 29.3 | 13.2 | —[5] |
| Creep Test (90° C., 1000 min) | 5 | 5 | 4 | 4 |

[1] Isocyanate Compound (1): Coronate L
[2] Active Component Content: Isocyanate compound content in isocyanate compound (parts by mass)
[3] NCO Content: Isocyanate group content (mass %) based on mass of solid in adhesive composition
[4] Commercially-available soda lime glass plate that contained an alkali component and that had been washed using an alkali was used as the glass plate.
[5] Not measured
[6] Stick strip occurred (phenomenon in which film repeatedly became caught or slipped during peeling).

As can be seen from the results in Table 3, the adhesive compositions of Examples 1 and 2 contained the acrylic triblock copolymer (I) (acrylic triblock copolymers (Ia), (Ib), and (Id)), which satisfied the above-described requirements (E1), (E2), (E3), and (E4) prescribed by the present invention, and the isocyanate compound (isocyanate compound (1) ("Coronate L")) in an amount within the range prescribed by the present invention. The pressure sensitive adhesive type optical films produced using the adhesive compositions of Examples 1 and 2 have a higher adhesive strength to a glass plate and a WV film as well as a higher evaluation in the creep test and better durability than the pressure sensitive adhesive type optical films of Comparative Examples 1 and 2, which were produced using an adhesive composition that did not contain an isocyanate compound and was only formed from the acrylic triblock copolymer (I) (Comparative Example 1) or an adhesive composition that did contain an isocyanate compound but had an isocyanate compound content that exceeded the range prescribed by the present invention (Comparative Example 2). More specifically, the pressure sensitive adhesive type optical films produced using the adhesive compositions of Examples 1 and 2 had superior adhesive strength to the substrate (polarizing plate etc.), so that they were less susceptible to deterioration of adhesive strength or air bubbles being produced even when exposed to heating or wet heat, could maintain good adhesion properties for a long period, and had excellent durability.

Further, a comparison was made of the adhesive strength for Example 2 after a storage time of 24 hours and after a storage time of 7 days. The adhesive strength to glass was large, did not change, and was 20 N/25 mm or less. In contrast, the adhesive strength to the WV film was larger after 7 days storage than after 24 hours storage, and the adhesive strength after 7 days storage exceeded 25 N/25 mm. Therefore, the adhesive composition of the present invention in Example 2 exhibits properties in which the adhesive strength to a WV film selectively increases over time. Based on this feature, when a WV film is used as an optical film or when a polarizing plate produced using a WV film as a protective film that has a retardation function is used as an optical film, and this optical film is adhered to glass such as a liquid crystal cell using the adhesive composition of the present invention, the obtained adhered product (laminate) is thoroughly adhered. The adhesive strength of this product is not only very durable, but when the optical film is peeled from the glass, the adhesive composition does not leave an adhesive residue. The adhesive composition stays on the optical film face and cleanly peels off from the other glass face. Consequently, excellent reworking properties are exhibited.

In contrast, the pressure sensitive adhesive of Comparative Example 1 exhibited no large increase in adhesive strength between the after 24 hours storage and the 7 days storage for either the adhesive strength to glass or the adhesive strength to a WV film. Moreover, the adhesive strength was lower than for the adhesive composition of Example 2, and there was no difference in the value of the adhesive strength to glass with the value of the adhesive strength to the WV film. Consequently, if the pressure sensitive adhesive of Comparative Example 1 is used as a pressure sensitive adhesive for a WV film or an optical film like a polarizing plate, for example, produced using a WV film, it would be difficult to say that the durability and reworking properties of the resultant product would be sufficient.

Examples 2 and 4 and Comparative Example 3

(1) The acrylic triblock copolymers (Ia), (Ib), and (Id) produced in the above Synthesis Examples 1, 2, and 4 were mixed in a percentage of, respectively, 65.0 parts by mass, 25.0 parts by mass, and 10.0 parts by mass as shown in the following Table 4 (for a total of 100 parts by mass of acrylic triblock copolymer (I)). The resultant mixture was added with the isocyanate compound (1) ("Coronate L", manufactured by Nippon Polyurethane Industry Co., Ltd.) or the isocyanate compound (2) ("Coronate 2233", manufactured by Nippon Polyurethane Industry Co., Ltd.) in the amount shown in the following Table 4 (Examples 3 and 4), or not added with an isocyanate compound (Comparative Example 3), to produce an adhesive composition. Then, the adhesive composition was diluted with ethyl acetate so that the overall solid content was 35 mass %, and shaken to produce the respective adhesive composition solutions. The moisture content in the thus-produced adhesive composition solutions was measured by the above-described method using a coulometric titrator moisture measurement apparatus based on the Karl Fischer method. The obtained results are shown in the following Table 4.

(2) Each of the adhesive composition solutions obtained in the above (1) was coated on a polyethylene terephthalate film (thickness 50 μm) (PET substrate film) using a bar coater, and then dried at 60° C. for 30 minutes to produce each of the pressure sensitive adhesive type optical films formed from an adhesive composition layer and a PET substrate film. The thickness of the adhesive composition layer in each pressure sensitive adhesive type optical film was as shown in the following Table 4.

(3) Each of the pressure sensitive adhesive type optical films obtained in the above (2) was measured for its adhesive strength (polarizing plate adhesive strength) to a polarizing plate A (a 200 μm-thick polarizing plate having a TAC/PVA/WV film layer structure with a WV film as a protective film, in which the face in contact with the adhesive composition layer is a discotic liquid crystal coating face) based on the above-described method. The results are shown in the following Table 4.

Examples 5 and 6 and Comparative Example 4

(1) Each of the acrylic triblock copolymers (Ia), (Ib), and (Id) produced in the above Synthesis Examples 1, 2, and 4 was dried for 24 hours with 60° C. hot air using a hot air dryer ("Safety Oven SPH-201", manufactured by ESPEC Corp.), and then mixed in a percentage of, respectively, 65.0 parts by mass, 25.0 parts by mass, and 10.0 parts by mass as shown in the following Table 4 (for a total of 100 parts by mass of acrylic triblock copolymer (I)). The resultant mixture was added with the isocyanate compound (1) ("Coronate L", manufactured by Nippon Polyurethane Industry Co., Ltd.) or the isocyanate compound (2) ("Coronate 2233", manufactured by Nippon Polyurethane Industry Co., Ltd.) in the amount shown in the following Table 4 (Examples 5 and 6), or not added with an isocyanate compound (Comparative Example 4), to produce an adhesive composition. Then, the adhesive composition was diluted with ethyl acetate so that the overall solid content was 35 mass %, and shaken to produce each of the adhesive composition solutions. The moisture content in the thus-produced adhesive composition solutions was measured by the above-described method using a coulometric titrator moisture measurement apparatus based on the Karl Fischer method. The obtained results are shown in the following Table 4.

(2) Each of the adhesive composition solutions obtained in the above (1) was coated on a polyethylene terephthalate film (thickness 50 μm) (PET substrate film) using a bar coater, and then dried at 60° C. for 30 minutes to produce each of the pressure sensitive adhesive type optical films each formed from an adhesive composition layer and a PET substrate film. The thickness of the adhesive composition layer in each pressure sensitive adhesive type optical film was as shown in the following Table 4.

(3) Each of the pressure sensitive adhesive type optical films obtained in the above (2) was measured for its adhesive strength (polarizing plate adhesive strength) to a polarizing plate A (a 200 μm-thick polarizing plate having a TAC/PVA/WV film layer structure with a WV film as a protective film, in which the face in contact with the adhesive composition layer is a discotic liquid crystal coating face) based on the above-described method. The results are shown in the following Table 4.

TABLE 4

|  | Example 3 | Example 4 | Comparative Example 3 | Example 5 | Example 6 | Comparative Example 4 |
|---|---|---|---|---|---|---|
| Composition of Adhesive Composition |  |  |  |  |  |  |
| Block Copolymer (parts by mass): |  |  |  |  |  |  |
| Acrylic Triblock Copolymer (Ia) (Mw = 63,000) | 65.0 | 65.0 | 65.0 | 65.0 | 65.0 | 65.0 |
| Acrylic Triblock Copolymer (Ib) (Mw = 110,000) | 25.0 | 25.0 | 25.0 | 25.0 | 25.0 | 25.0 |
| Acrylic Triblock Copolymer (Id) (Mw = 132,000) | 10.0 | 10.0 | 10.0 | 10.0 | 10.0 | 10.0 |

TABLE 4-continued

| | Example 3 | Example 4 | Comparative Example 3 | Example 5 | Example 6 | Comparative Example 4 |
|---|---|---|---|---|---|---|
| Isocyanate Compound[1]: | | | | | | |
| Isocyanate Compound (1) (parts by mass) | 0.67 | 0 | 0 | 0.67 | 0 | 0 |
| (Active Component Content) (parts by mass)[2] | (0.5) | | | (0.5) | | |
| (NCO Content)[3] | (0.09%) | | | (0.09%) | | |
| Isocyanate Compound (2) (parts by mass) | 0 | 1.25 | 0 | 0 | 1.25 | 0 |
| (Active Component Content) (parts by mass)[2] | | (0.5) | | | (0.5) | |
| (NCO Content)[3] | | (0.07%) | | | (0.07%) | |
| Moisture content in adhesive composition (ppm) | 1420 | 1420 | 1420 | 960 | 960 | 960 |
| Adhesive Optical Film Thickness of Optical Film Layer Composition Layer (μm) | 29.8 | 28.7 | 29.0 | 27.6 | 28.4 | 27.9 |
| Adhesive Strength: Polarizing plate adhesive Strength (N/25 mm) | | | | | | |

| Storage Time | Peeling Rate | | | | | | |
|---|---|---|---|---|---|---|---|
| 24 hr | 30 mm/min | 11.5 | 11.4 | 10.6 | 11.3 | 11.7 | 11.0 |
| 3 d | 30 mm/min | 13.1 | 13.0 | 12.9 | 13.5 | 13.9 | 12.2 |
| 7 d | 30 mm/min | 15.7 | 14.1 | 13.7 | 14.5 | 15.8 | 13.2 |

[1] Isocyanate Compound: Isocyanate Compound(1): Coronate L Isocyanate Compound (2): Coronate 2233
[2] Active Component Content: Isocyanate compound content in isocyanate compound (parts by mass)
[3] NCO Content: Isocyanate group content (mass %) based on mass of solid in adhesive composition As can be seen from the results in Table 4, the adhesive compositions of Examples 3 and 4 contained the acrylic triblock copolymer (I) (acrylic triblock copolymers (Ia), (Ib), and (Id)), which satisfied the above-described requirements (E1), (E2), (E3), and (E4) prescribed by the present invention, and the isocyanate compound (isocyanate compound (1) ("Coronate L") or isocyanate compound (2) ("Coronate 2233")) in an amount within the range prescribed by the present invention. The pressure sensitive adhesive type optical films produced using the adhesive compositions of Examples 3 and 4 have a higher adhesive strength to a polarizing plate and better substrate adhesion properties than the pressure sensitive adhesive type optical film of Comparative Example 3, which was produced using an adhesive composition that did not contain an isocyanate compound and was only formed from the acrylic triblock copolymer (I).

Further, the adhesive compositions of Examples 5 and 6 contained the acrylic triblock copolymer (I) (acrylic triblock copolymers (Ia), (Ib), and (Id)), whose moisture content had been reduced by the drying treatment, and the isocyanate compound (isocyanate compound (1) ("Coronate L") or isocyanate compound (2) ("Coronate 2233")) in an amount within the range prescribed by the present invention. The pressure sensitive adhesive type optical films produced using the adhesive compositions of Examples 5 and 6 have a higher adhesive strength to a polarizing plate and better substrate adhesion properties than the pressure sensitive adhesive type optical film of Comparative Example 4, which was produced using an adhesive composition that did not contain an isocyanate compound and was only formed from the acrylic triblock copolymer (I).

In addition, compared with the adhesive composition of Example 5, the adhesive composition of Example 6 exhibited a higher reactivity with a reactive functional group, and under low moisture content conditions, a higher polarizing plate adhesive strength, and an especially superior substrate adhesive strength. Based on these features, the adhesive composition of Example 6 only needs a short aging time until a predetermined substrate adhesive strength is reached.

Examples 7 and 8 and Comparative Examples 5 and 6

(1) The acrylic triblock copolymers (Ia), (Ib), (Ic), and (Id) produced in the above Synthesis Examples 1, 2, 3, and 4 and the acrylic diblock copolymer (IIa) produced in Synthesis Example 5 were mixed in a percentage of, respectively, 40.5 parts by mass, 22.5 parts by mass, 18.0 parts by mass, 9.0 parts by mass, and 10.0 parts by mass as shown in the following Table 5 (for a total of 100 parts by mass of acrylic triblock copolymer (Ia) to (Id) and acrylic diblock copolymer (IIa)). The resultant mixture was added with the isocyanate compound (1) ("Coronate L", manufactured by Nippon Polyurethane Industry Co., Ltd.) in the amount shown in the following Table 5 (Examples 7 and 8), or not added with an isocyanate compound (Comparative Examples 5 and 6), as well as added with a silane coupling agent (KBM-403, manufactured by Shin-Etsu Chemical Co. Ltd.) in the amount shown in the following Table 5 (Example 7 and Comparative Example 5), or not added with a silane coupling agent (Example 8 and Comparative Example 6), to produce an adhesive composition. Then, the adhesive composition was diluted with a mixture of ethyl acetate/toluene (52/48 by mass) so that the overall solid content was 30 mass %, and shaken to produce the respective adhesive composition solutions.

(2) Each of the adhesive composition solutions obtained in the above (1) was coated to a width of 800 mm on a separator film ("A71", manufactured by Teijin DuPont Films Japan Limited, thickness 50 μm) using a die coater, and dried for 2 minutes at 80° C. Then, the polarizing plate A (a 200 μm-thick polarizing plate having a TAC/PVA/WV film layer structure with a WV film as a protective film) was laminated on the separator film, to produce each of the pressure sensitive adhesive type optical films each formed from a separator film/pressure sensitive adhesive layer (adhesive composition layer)/polarizing plate A.

(3)(i) Each of the pressure sensitive adhesive type optical films obtained in the above (2) was, after peeling off the separator film, measured for its adhesive strength to a glass plate (glass adhesive strength) based on the above-described method. The results are shown in the following Table 5.

(ii) Further, after the adhesive strength measurement in (i) above (after the measurement test of the 180° peeling adhesive strength), the polarizing plates were visually observed to see whether the sticky face of the pressure sensitive adhesive (adhesive composition) coated on the polarizing plates was roughened. If the sticky face was roughened, the plate was marked as "sticky face roughening", and if the sticky face was not roughened, the plate was marked as "sticky face not roughened". Based on these results, the reworking properties were evaluated.

In this evaluation, when the sticky face is roughened, even if there was no adhesive residue at the peeling rate for the measurement conditions, there is a high probability of adhesive residue when peeling at a higher rate or when peeling a polarizing plate with a large surface area, so that the reworking properties are poor.

(4) In addition, each of the pressure sensitive adhesive type optical films obtained in the above (2) was, after peeling off the separator film, subjected to a creep test and a wet heat creep test based on the above-described method. The results are shown in the following Table 5.

As can be seen from the results in Table 5, the adhesive compositions of Examples 7 and 8 contained the acrylic triblock copolymer (I) (acrylic triblock copolymers (Ia) to (Id)), which satisfied the above-described requirements (E1), (E2), (E3), and (E4) prescribed by the present invention, the acrylic diblock copolymer (II) (acrylic triblock copolymer (IIa)), and an isocyanate compound in an amount within the range prescribed by the present invention. The pressure sensitive adhesive type optical films produced using the adhesive compositions of Examples 7 and 8 have better reworking properties without substantially increasing the adhesive strength to a glass plate, as well as a higher evaluation in the creep test and the wet heat creep test and better durability than the pressure sensitive adhesive type optical films of Comparative Examples 5 and 6, which were produced using an adhesive composition that did not contain an isocyanate compound, even though they contained the acrylic triblock copolymer (I) (acrylic triblock copolymers (Ia) to (Id)) and the acrylic diblock copolymer (II) (acrylic triblock copolymer (IIa)). Even among these, the adhesive composition of Example 7 contained a silane coupling agent in addition to the acrylic triblock copolymer (I) and the isocyanate compound, and accordingly, the pressure sensitive adhesive type optical film produced using the adhesive composition of Example 7 had a much higher evaluation in the creep test and the wet heat creep test and far better durability.

Examples 9 and 10 and Comparative Examples 7 and 8

(1) The acrylic triblock copolymers (Ia), (Ib), (Ic), and (Id) produced in the above Synthesis Examples 1, 2, 3, and 4 and

TABLE 5

| | | Example 7 | Example 8 | Comparative Example 5 | Comparative Example 6 |
|---|---|---|---|---|---|
| Composition of Adhesive Composition Block Copolymer (parts by mass): | | | | | |
| Acrylic Triblock Copolymer (Ia) (Mw = 63,000) | | 40.5 | 40.5 | 40.5 | 40.5 |
| Acrylic Triblock Copolymer (Ib) (Mw = 110,000) | | 22.5 | 22.5 | 22.5 | 22.5 |
| Acrylic Triblock Copolymer (Ic) (Mw = 67,000) | | 18.0 | 18.0 | 18.0 | 18.0 |
| Acrylic Triblock Copolymer (Id) (Mw = 132,000) | | 9.0 | 9.0 | 9.0 | 9.0 |
| Acrylic Diblock Copolymer (II) (Mw = 92,000) | | 10.0 | 10.0 | 10.0 | 10.0 |
| Isocyanate Compound: | | | | | |
| Isocyanate Compound (1)[1] (parts by mass) | | 1.33 | 1.33 | 0 | 0 |
| (Active Component Content) (parts by mass)[2] | | (1.0) | (1.0) | (0) | (0) |
| (NCO Content)[3] | | (0.18 mass %) | (0.18 mass %) | (0 mass %) | (0 mass %) |
| Silane Coupling Agent: KBM-403 (parts by mass) | | 0.4 | — | 0.4 | — |
| Adhesive Optical Film Adhesive Strength: Glass Adhesive Strength (N/25 mm)[4] | | | | | |
| Storage Time | Peeling Rate | | | | |
| 24 hr | 30 mm/min | 1.8 | 1.6 | 1.2 | 1.1 |
| 24 hr | 300 mm/min | 7.6 | 7.1 | 6.3 | 5.3 |
| Sticky Face Roughening During Peeling | | No | No | Yes | Yes |
| Creep Test (90° C., 1000 min) | | 4.5 | 4 | 3.25 | 2.75 |
| Wet Heat Creep Test Results (70° C., 95% RH, 1000 min) | | 5 | 4.5 | 4 | 2.5 |

[1] Isocyanate Compound(1): Coronate L
[2] Active Component Content: Isocyanate compound content in Coronate L (parts by mass)
[3] NCO Content: Isocyanate group content (mass %) based on mass of solid in adhesive composition
[4] Alkali-free glass plate for an liquid crystal display that did not contain an alkali component was used as the glass plate.

the acrylic diblock copolymer (IIa) produced in Synthesis Example 5 were mixed in a percentage of, respectively, 40.5 parts by mass, 22.5 parts by mass, 18.0 parts by mass, 9.0 parts by mass, and 10.0 parts by mass as shown in the following Table 6 (for a total of 100 parts by mass of acrylic triblock copolymer (Ia) to (Id) and acrylic diblock copolymer (IIa)). The resultant mixture was added with the isocyanate compound (1) ("Coronate L", manufactured by Nippon Polyurethane Industry Co., Ltd.) in the amount shown in the following Table 6 (Examples 9 and 10), or not added with an isocyanate compound (Comparative Examples 7 and 8), as well as added with an antistatic agent of the type and in the amount shown in Table 6, to produce an adhesive composition. Then, the adhesive composition was diluted with ethyl acetate so that the overall solid content was 35 mass %, and shaken to produce the respective adhesive composition solutions.

(2) Each of the adhesive composition solutions obtained in the above (1) was coated on a separator film ("A71", manufactured by Teijin DuPont Films Japan Limited, thickness 50 μm) using a bar coater, and dried for 30 minutes at 60° C., to produce each of the pressure sensitive adhesive type optical films each formed from an adhesive composition layer and a separator film.

(3) Each of the pressure sensitive adhesive type optical films produced in the above (2) was laminated with a polarizing plate B (a 200 μm-thick polarizing plate having a TAC/PVA/TAC layer structure), to produce each of the pressure sensitive adhesive type optical films each formed from a separator film/adhesive composition layer/polarizing plate B.

(4) Using each of the pressure sensitive adhesive type optical films obtained in the above (3), the separator film was peeled off, and the adhesive strength to a glass plate (glass adhesive strength) was measured based on the above-described method. The results are shown in the following Table 6.

(5) Further, each of the pressure sensitive adhesive type optical films obtained in the above (3) was, after peeling off the separator film, subjected to a creep test based on the above-described method. The results are shown in the following Table 6.

(6) In addition, each of the pressure sensitive adhesive type optical films obtained in the above (3) was, after peeling off the separator film, measured for its surface resistance based on the above-described method. The results are shown in the following Table 6.

Examples 11 and 12 and Comparative Examples 9 to 11

(1) The acrylic triblock copolymers (Ia), (Ib), (Ic), and (Id) produced in the above Synthesis Examples 1, 2, 3, and 4 and the acrylic diblock copolymer (IIa) produced in Synthesis Example 5 were mixed in a percentage of, respectively, 40.5 parts by mass, 22.5 parts by mass, 18.0 parts by mass, 9.0 parts by mass, and 10.0 parts by mass as shown in the following Table 7 (for a total of 100 parts by mass of acrylic triblock copolymer (Ia) to (Id) and acrylic diblock copolymer (IIa)). The resultant mixture was added with the isocyanate compound (1) ("Coronate L", manufactured by Nippon Polyurethane Industry Co., Ltd.) in the amount shown in the following Table 7 (Examples 11 and 12), or not added with an isocyanate compound (Comparative Examples 9 to 11), as well as added with an antistatic agent of the type and in the amount shown in Table 7 (Examples 11 and 12, and Comparative Examples 9 and 10), or not added with an antistatic agent (Comparative Example 11), to produce an adhesive composition. Then, the adhesive composition was diluted with ethyl acetate so that the overall solid content was 35 mass %, and shaken to produce each of the adhesive composition solutions.

(2) Each of the adhesive composition solutions obtained in the above (1) was coated on a separator film ("A71", manufactured by Teijin DuPont Films Japan Limited, thickness 50 μm) using a bar coater, and dried for 30 minutes at 60° C., to produce each of the pressure sensitive adhesive type optical films each formed from an adhesive composition layer and a separator film.

(3) Each of the pressure sensitive adhesive type optical films produced in the above (2) was laminated with a polarizing plate B (a 200 μm-thick polarizing plate having a TAC/PVA/TAC layer structure), to produce each of the pressure sensitive adhesive type optical films each formed from a separator film/adhesive composition layer/polarizing plate B.

(4) Using each of the pressure sensitive adhesive type optical films obtained in the above (3), the separator film was peeled off, and the adhesive strength to a glass plate (glass adhesive strength) was measured based on the above-described method. The results are shown in the following Table 7.

(5) Further, each of the pressure sensitive adhesive type optical films obtained in the above (3) was, after peeling off the separator film, subjected to a creep test based on the above-described method. The results are shown in the following Table 7.

(6) In addition, each of the pressure sensitive adhesive type optical films obtained in the above (3) was, after peeling off the separator film, measured for its surface resistance based on the above-described method. The results are shown in the following Table 7.

TABLE 6

|  | Example 9 | Comparative Example 7 | Example 10 | Comparative Example 8 |
|---|---|---|---|---|
| Composition of Adhesive (Adhesive Composition) Block Copolymer (parts by mass): | | | | |
| Acrylic Triblock Copolymer (Ia) (Mw = 63,000) | 40.5 | 40.5 | 40.5 | 40.5 |
| Acrylic Triblock Copolymer (Ib) (Mw = 110,000) | 22.5 | 22.5 | 22.5 | 22.5 |
| Acrylic Triblock Copolymer (Ic) (Mw = 67,000) | 18.0 | 18.0 | 18.0 | 18.0 |
| Acrylic Triblock Copolymer (Id) (Mw = 132,000) | 9.0 | 9.0 | 9.0 | 9.0 |

TABLE 6-continued

|  | Example 9 | Comparative Example 7 | Example 10 | Comparative Example 8 |
|---|---|---|---|---|
| Acrylic Diblock Copolymer (II) (Mw = 92,000) | 10.0 | 10.0 | 10.0 | 10.0 |
| Isocyanate Compound: |  |  |  |  |
| Isocyanate Compound (1)[1] (parts by mass) | 0.67 | 0 | 0.67 | 0 |
| (Active Component Content) (parts by mass)[2] | (0.5) | (0) | (0.5) | (0) |
| (NCO Content)[3] | (0.09 mass %) | (0 mass %) | (0.09 mass %) | (0 mass %) |
| Antistatic Agent (parts by mass): |  |  |  |  |
| Antistatic Agent (1)(Ion conductive agent Type) (PC6860) | 2.0 | 2.0 | — | — |
| Antistatic Agent (2)(Ion conductive agent Type) (Sankonol PEO-20R) | — | — | 2.0 | 2.0 |
| Antistatic Agent (3)(Ion conductive agent Type) (Sankonol 0862-20R | — | — | — | — |
| Antistatic Agent (4)(Ionic Liquid) (CIL312) | — | — | — | — |

Adhesive Optical Film Adhesive Strength:
Glass Adhesive Strength (N/25 mm)[4]

| Storage Time | Peeling Rate |  |  |  |  |
|---|---|---|---|---|---|
| 24 hr | 30 mm/min | 13.31 | 0.74 | 21.99 | 1.77 |
| 24 hr | 300 mm/min | 32.13 | 0.78 | 36.84 | 13.85 |
| Creep Test (90° C., 1000 min) |  | 2.5 | 1 | 3.5 | 3 |
| Surface Resistance (Ω/sq.) |  | $1.9 \times 10^{11}$ | $2.2 \times 10^{11}$ | $5.5 \times 10^{12}$ | $4.4 \times 10^{12}$ |

[1] Isocyanate Compound(1): Coronate L
[2] Active Component Content: Isocyanate compound content in Coronate L (parts by mass)
[3] NCO Content: Isocyanate group content (mass %) based on mass of solid in adhesive composition
[4] Commercially-available soda lime glass plate that contained an alkali component and that had been washed using an alkali was used as the glass plate.

TABLE 7

|  | Example 11 | Comparative Example 9 | Example 12 | Comparative Example 10 | Comparative Example 11 |
|---|---|---|---|---|---|
| Composition of Adhesive (Adhesive Composition) |  |  |  |  |  |
| Block Copolymer (parts by mass): |  |  |  |  |  |
| Acrylic Triblock Copolymer (Ia) (Mw = 63,000) | 40.5 | 40.5 | 40.5 | 40.5 | 40.5 |
| Acrylic Triblock Copolymer (Ib) (Mw = 110,000) | 22.5 | 22.5 | 22.5 | 22.5 | 22.5 |
| Acrylic Triblock Copolymer (Ic) (Mw = 67,000) | 18.0 | 18.0 | 18.0 | 18.0 | 18.0 |
| Acrylic Triblock Copolymer (Id) (Mw = 132,000) | 9.0 | 9.0 | 9.0 | 9.0 | 9.0 |
| Acrylic Diblock Copolymer (II) (Mw = 92,000) | 10.0 | 10.0 | 10.0 | 10.0 | 10.0 |
| Isocyanate Compound: |  |  |  |  |  |
| Isocyanate Compound (1)[1] (parts by mass) | 0.67 | 0 | 0.67 | 0 | 0 |
| (Active Component Content) (parts by mass)[2] | (0.5) | (0) | (0.5) | (0) | (0) |
| (NCO Content)[3] | (0.09 mass %) | (0 mass %) | (0.09 mass %) | (0 mass %) | (0 mass %) |
| Antistatic Agent (parts by mass): |  |  |  |  |  |
| Antistatic Agent (1) (Ion conductive agent Type) (PC6860) | — | — | — | — | — |
| Antistatic Agent (2) (Ion conductive agent Type) (PEO-20R) | — | — | — | — | — |
| Antistatic Agent (3) (Ion conductive agent Type) (0862-20R | 2.0 | 2.0 | — | — | — |
| Antistatic Agent (4) (Ionic Liquid) (CIL312) | — | — | 1.0 | 1.0 | — |

TABLE 7-continued

|  |  | Example 11 | Comparative Example 9 | Example 12 | Comparative Example 10 | Comparative Example 11 |
|---|---|---|---|---|---|---|
| Adhesive Optical Film Adhesive Strength: Glass Adhesive Strength (N/25 mm)[4] | | | | | | |
| Storage Time | Peeling Rate | | | | | |
| 24 hr | 30 mm/min | 17.65 | 2.14 | 31.66 | 2.90 | 2.60 |
| 24 hr | 300 mm/min | 36.46 | 13.17 | 37 or more | 16.39 | 17.19 |
| Creep Test (90° C., 1000 min) | | 4 | 3 | 5 | 4 | 5 |
| Surface Resistance (Ω/sq.) | | $1.7 \times 10^{12}$ | $1.7 \times 10^{12}$ | $5.2 \times 10^{12}$ | $1.4 \times 10^{12}$ | $1.4 \times 10^{15}$ |

[1] Isocyanate Compound (1): Coronate L
[2] Active Component Content: Isocyanate compound content in Coronate L (parts by mass)
[3] NCO Content: Isocyanate group content (mass %) based on mass of solid in adhesive composition
[4] Commercially-available soda lime glass plate that contained an alkali component and that had been washed using an alkali was used as the glass plate.

It can be clearly seen from comparisons between Example 9 and Comparative Example 7, and between Example 10 and Comparative Example 8 in Table 6, and between Example 11 and Comparative Example 9, and between Example 12 and Comparative Example 10 in Table 7, that when an antistatic agent is included along with the isocyanate compound in the adhesive composition having the acrylic triblock copolymer (I) as a main component, an antistatic property can be imparted while maintaining excellent glass adhesive strength and creep properties (durability).

Example 13 and Comparative Examples 12 and 13

(1) The acrylic triblock copolymers (Ia), (Ib), (Ic), and (Id) produced in the above Synthesis Examples 1, 2, 3, and 4 and the acrylic diblock copolymer (IIa) produced in Synthesis Example 5 were mixed in a percentage of, respectively, 40.5 parts by mass, 22.5 parts by mass, 18.0 parts by mass, and 9.0 parts by mass as shown in the following Table 8 (for a total of 100 parts by mass of acrylic triblock copolymer (Ia) to (Id) and acrylic diblock copolymer (IIa)). The resultant mixture was added with the isocyanate compound (1) ("Coronate L", manufactured by Nippon Polyurethane Industry Co., Ltd.) in the amount shown in the following Table 8 (Example 13), or not added with an isocyanate compound (Comparative Examples 12 and 13), as well as added with an antistatic agent of the type and in the amount shown in Table 8, and further added with the polyol compound shown in the following Table 8 (Example 13 and Comparative Example 12) or not added with a polyol compound (Comparative Example 13), to produce an adhesive composition. Then, the adhesive composition was diluted with ethyl acetate so that the overall solid content was 35 mass %, and shaken to produce each of the adhesive composition solutions.

(2) Each of the adhesive composition solutions obtained in the above (1) was coated on a separator film ("A71", manufactured by Teijin DuPont Films Japan Limited, thickness 50 µm) using a bar coater, and dried for 30 minutes at 60° C., to produce each of the pressure sensitive adhesive type optical films each formed from an adhesive composition layer/a separator film.

(3) Each of the pressure sensitive adhesive type optical films produced in the above (2) was laminated with a polarizing plate B (a 200 µm-thick polarizing plate having a TAC/PVA/TAC layer structure), to produce the respective pressure sensitive adhesive type optical films formed from a separator film/adhesive composition layer/polarizing plate B.

(4) Using each of the pressure sensitive adhesive type optical films obtained in the above (3), the separator film was peeled off, and the adhesive strength to a glass plate (glass adhesive strength) was measured based on the above-described method. The results are shown in the following Table 8.

(5) Further, each of the pressure sensitive adhesive type optical films obtained in the above (3) was, after peeling off the separator film, subjected to a creep test based on the above-described method. The results are shown in the following Table 8.

(6) In addition, each of the pressure sensitive adhesive type optical films obtained in the above (3) was, after peeling off the separator film, measured for its surface resistance based on the above-described method. The results are shown in the following Table 8.

TABLE 8

|  | Example 13 | Comparative Example 12 | Comparative Example 13 |
|---|---|---|---|
| Composition of Adhesive (Adhesive Composition) Block Copolymer (parts by mass): | | | |
| Acrylic Triblock Copolymer (Ia) (Mw = 63,000) | 40.5 | 40.5 | 40.5 |
| Acrylic Triblock Copolymer (Ib) (Mw = 110,000) | 22.5 | 22.5 | 22.5 |
| Acrylic Triblock Copolymer (Ic) (Mw = 67,000) | 18.0 | 18.0 | 18.0 |
| Acrylic Triblock Copolymer (Id) (Mw = 132,000) | 9.0 | 9.0 | 9.0 |
| Acrylic Diblock Copolymer (II) (Mw = 92,000) | 10.0 | 10.0 | 10.0 |

TABLE 8-continued

|  | Example 13 | Comparative Example 12 | Comparative Example 13 |
|---|---|---|---|
| Isocyanate Compound: | | | |
| Isocyanate Compound (1)[1] (parts by mass) | 0.67 | 0 | 0 |
| (Active Component Content) (parts by mass)[2] | (0.5) | (0) | (0) |
| (NCO Content)[3] | (0.09 mass %) | (0 mass %) | (0 mass %) |
| Antistatic Agent (parts by mass): | | | |
| Antistatic Agent (5) (Ionic Liquid) (CIL319) | 1.0 | 1.0 | 1.0 |
| Polyol Compound (parts by mass) Kuraray Polyol P1010 | 3.0 | 3.0 | — |
| Adhesive Optical Film Adhesive Strength: Glass Adhesive Strength (N/25 mm)[4] | | | |
| Storage Time / Peeling Rate | | | |
| 24 hr / 30 mm/min | 2.71 | 0.70 | 1.30 |
| 24 hr / 300 mm/min | 10.59 | 2.89 | 8.76 |
| Creep Test (90° C., 1000 min) | 2.5 | 2 | 2 |
| Surface Resistance ($\Omega$/sq.) | $3.2 \times 10^{12}$ | $5.3 \times 10^{12}$ | $2.0 \times 10^{13}$ |

[1]Isocyanate Compound (1): Coronate L
[2]Active Component Content: Isocyanate compound content in Coronate L (parts by mass)
[3]NCO Content: Isocyanate group content (mass %) based on mass of solid in adhesive composition
[4]Commercially-available soda lime glass plate that contained an alkali component and that had been washed using an alkali was used as the glass plate.

As can be seen from Table 8, when a polyol compound is further included in an adhesive composition which has the acrylic triblock copolymer (I) as a main component, and which includes an isocyanate compound and an antistatic agent, the surface resistance is further decreased and the antistatic performance improves.

Industrial Applicability

The adhesive composition for an optical film of the present invention includes an isocyanate compound, while being a non-chemical crosslinking type pressure sensitive adhesive for an optical film having an acrylic triblock copolymer (I) as a main component. Consequently, the adhesive composition has excellent adhesion to an optical film substrate, and excellent reworking properties, adhesion properties, heat resistance, durability and the like. Therefore, the adhesive composition can be effectively used in the production of a pressure sensitive adhesive type optical film and a pressure sensitive adhesive type protective film for an optical film.

The invention claimed is:

1. An adhesive composition, comprising:
an isocyanate compound; and
an acrylic triblock copolymer (I)
represented by formula (1):

$$A1\text{-}B\text{-}A2 \qquad (1),$$

where A1 and A2 each independently represent an alkyl methacrylate polymer block that does not have a functional group that reacts with the isocyanate compound and has a glass transition temperature of 100° C. or more, and B represents an alkyl acrylate polymer block that does not have a functional group that reacts with the isocyanate compound and has a glass transition temperature of −20° C. or less,
wherein:
the acrylic triblock copolymer (I) has a content of the polymer block B of from 40 to 95 mass %, a weight average molecular weight Mw of from 50,000 to 300,000, and a molecular weight distribution Mw/Mn of from 1.0 to 1.5;
the adhesive composition has a content of the acrylic triblock copolymer (I) of 60 mass % or more based on a mass of solids in the adhesive composition;
the adhesive composition has a content of isocyanate groups of from 0.0015 mass % or more to less than 0.35 mass %, based on the mass of solids in the adhesive composition, said isocyanate groups being comprised in the isocyanate compound; and
the adhesive composition is suitable for an optical film.

2. The adhesive composition of claim 1, further comprising:
from 3 to 25 mass % of an acrylic diblock copolymer (II), based on the mass of solids in the adhesive composition, wherein
the acrylic diblock copolymer (II)
is represented by formula (2):

$$C\text{-}D \qquad (2)$$

where C represents an alkyl methacrylate polymer block that does not have a functional group that reacts with the isocyanate compound and D represents an alkyl acrylate polymer block that does not have a functional group that reacts with the isocyanate compound; and
the acrylic diblock copolymer (II) has a content of the polymer block D of from 40 to 95 mass %, a weight average molecular weight Mw of from 30,000 to 300,000, and a molecular weight distribution Mw/Mn of from 1.0 to 1.5.

3. The adhesive composition of claim 1, further comprising:
from 0.1 to 10 mass % of an antistatic agent, based on the mass of solids in the adhesive composition.

4. The adhesive composition of claim 3, further comprising:
from 0.05 to 9.5 mass % of a polyol compound, based on the mass of solids in the adhesive composition.

5. The adhesive composition of claim 3, wherein the antistatic agent is an ion conductive agent comprising an alkali metal salt.

6. The adhesive composition of claim 3, wherein the antistatic agent is an ionic liquid.

7. The adhesive composition of claim 1, further comprising:
from 0.01 to 3 mass % of a silane coupling agent, based on the mass of solids in the adhesive composition.

8. A film, comprising a pressure sensitive adhesive layer formed from the adhesive composition of claim 1,
wherein the film is a pressure sensitive adhesive optical film or a pressure sensitive adhesive protective film for an optical film.

9. An image display device, comprising the film of claim 8.

10. The adhesive composition of claim 2, further comprising:
from 0.1 to 10 mass % of an antistatic agent, based on the mass of solids in the adhesive composition.

11. The adhesive composition of claim 10, further comprising:
from 0.05 to 9.5 mass % of a polyol compound, based on the mass of solids in the adhesive composition.

12. The adhesive composition of claim 4, wherein the antistatic agent is an ion conductive agent comprising an alkali metal salt.

13. The adhesive composition of claim 10, wherein the antistatic agent is an ion conductive agent comprising an alkali metal salt.

14. The adhesive composition of claim 4, wherein the antistatic agent is an ionic liquid.

15. The adhesive composition of claim 10, wherein the antistatic agent is an ionic liquid.

16. The adhesive composition of claim 2, further comprising:
from 0.01 to 3 mass % of a silane coupling agent, based on the mass of solids in the adhesive composition.

17. The adhesive composition of claim 3, further comprising:
from 0.01 to 3 mass % of a silane coupling agent, based on the mass of solids in the adhesive composition.

18. The adhesive composition of claim 4, further comprising:
from 0.01 to 3 mass % of a silane coupling agent, based on the mass of solids in the adhesive composition.

19. The adhesive composition of claim 5, further comprising:
from 0.01 to 3 mass % of a silane coupling agent, based on the mass of solids in the adhesive composition.

20. The adhesive composition of claim 1, wherein the isocyanate compound increases interfacial adhesive strength between the adhesive composition and the optical film.

\* \* \* \* \*